(12) United States Patent
Okada et al.

(10) Patent No.: US 8,791,938 B2
(45) Date of Patent: *Jul. 29, 2014

(54) ELECTRONIC DEVICE AND CONTROL METHOD FOR THE SAME

(75) Inventors: Takayuki Okada, Tokyo (JP); Takashi Mikuriya, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 206 days.

This patent is subject to a terminal disclaimer.

(21) Appl. No.: 13/394,114

(22) PCT Filed: Sep. 3, 2009

(86) PCT No.: PCT/JP2009/065411
§ 371 (c)(1),
(2), (4) Date: Mar. 2, 2012

(87) PCT Pub. No.: WO2011/027447
PCT Pub. Date: Mar. 10, 2011

(65) Prior Publication Data
US 2012/0169587 A1 Jul. 5, 2012

(51) Int. Cl.
*G09G 5/00* (2006.01)
*H04N 9/31* (2006.01)
*G03B 21/14* (2006.01)

(52) U.S. Cl.
CPC ................ *G03B 21/14* (2013.01);
*H04N 9/3102* (2013.01)
USPC ............. 345/212; 345/211; 713/100

(58) Field of Classification Search
CPC .............. G09G 5/00; G09G 2330/00
USPC ............ 345/204, 211, 212; 726/2; 713/100
See application file for complete search history.

(56) References Cited

U.S. PATENT DOCUMENTS

| 7,343,341 B2 | 3/2008 | Sandor et al. |
| 7,742,830 B1 | 6/2010 | Botes |

(Continued)

FOREIGN PATENT DOCUMENTS

| JP | 11-313441 A | 11/1999 |
| JP | 2001-356648 A | 12/2001 |

(Continued)

OTHER PUBLICATIONS

International Search Report in PCT/JP2009/065411 dated Oct. 13, 2009 (English Translation Thereof).

(Continued)

*Primary Examiner* — Joe H Cheng
(74) *Attorney, Agent, or Firm* — McGinn IP Law Group, PLLC

(57) ABSTRACT

An electronic device of the present invention includes an input acceptance section that accepts an input of a command that causes any one of a plurality of operation states to be selected; a function section (342) that has a plurality of operation states that differ in power consumption and that operates in an operation state represented by the command that is input to the input acceptance section of the plurality of operation states; a storage section (16) that pre-stores power consumption values corresponding to the plurality of operation states and a conversion factor, based on which, power consumption is converted into an amount of emitted greenhouse gas; and a control section (15) that reads from the storage section a power consumption value corresponding to an operation state represented by the command that is input to the input acceptance section, multiplies the power consumption value that has been read by the conversion factor, obtains the multiplied result as the amount of the emitted greenhouse gas per unit time, and causes the obtained result to appear on a display section.

20 Claims, 16 Drawing Sheets

(56) References Cited

U.S. PATENT DOCUMENTS

| | | | |
|---|---|---|---|
| 8,214,841 B2 | 7/2012 | Amsterdam et al. | |
| 2003/0065471 A1* | 4/2003 | Tsuji et al. | 702/130 |
| 2004/0227456 A1 | 11/2004 | Matsui | |
| 2006/0244742 A1 | 11/2006 | Nakamura et al. | |
| 2008/0229226 A1 | 9/2008 | Rowbottom et al. | |
| 2009/0201293 A1* | 8/2009 | Tung et al. | 345/440 |
| 2010/0119920 A1* | 5/2010 | Logan et al. | 429/46 |
| 2010/0156908 A1* | 6/2010 | Honda et al. | 345/440 |
| 2012/0007841 A1 | 1/2012 | Nakamura et al. | |

FOREIGN PATENT DOCUMENTS

| | | |
|---|---|---|
| JP | 2003-167953 A | 6/2003 |
| JP | 2003-250224 A | 9/2003 |
| JP | 2004-060998 A | 2/2004 |
| JP | 2004-341206 A | 12/2004 |
| JP | 2007-053433 A | 3/2007 |
| JP | 2007-178059 A | 7/2007 |
| JP | 2007-225831 A | 9/2007 |
| JP | 2008-9489 | 1/2008 |
| JP | 2008-210316 A | 9/2008 |
| JP | 2009-131599 A | 6/2009 |

OTHER PUBLICATIONS

United States Office Action dated Feb. 4, 2014, in U.S. Appl. No. 13/387,710.

* cited by examiner

Fig.4

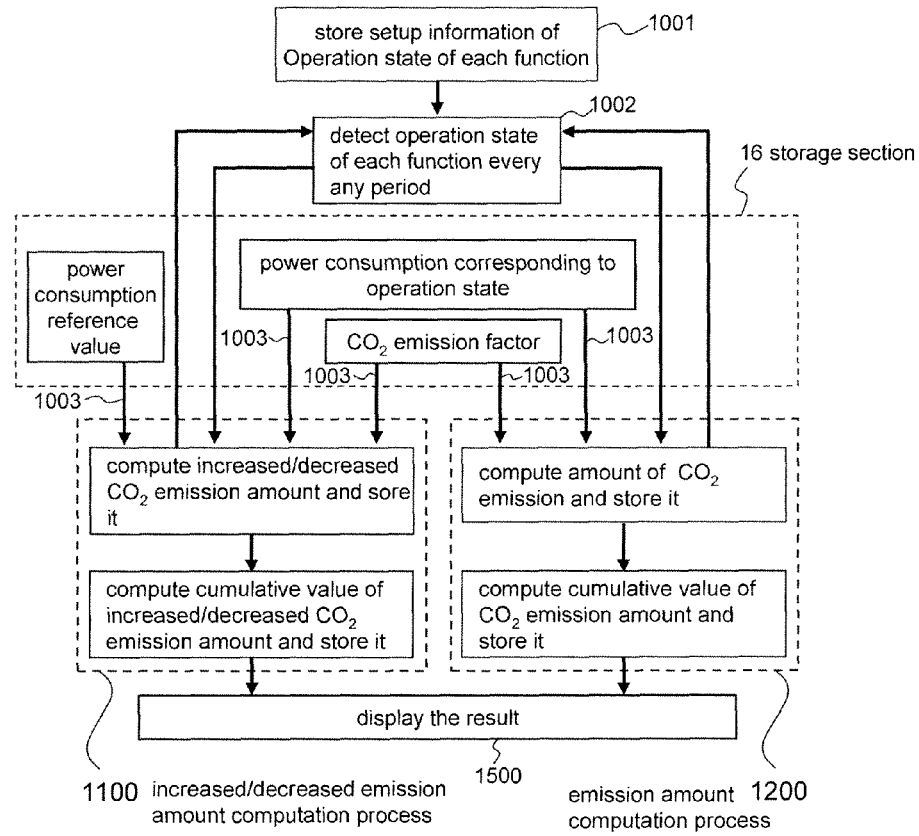

Fig.5

| operation state of the device | setup of operation state corresponding to function | | | power consumption of the device [W] |
| --- | --- | --- | --- | --- |
| | lamp output change function | LAN function | sound output function | |
| A | high brightness | ON | ON | 325 |
| B | high brightness | ON | OFF | 315 |
| C | high brightness | OFF | ON | 310 |
| D | high brightness | OFF | OFF | 300 |
| E | low brightness | ON | ON | 240 |
| F | low brightness | ON | OFF | 230 |
| G | low brightness | OFF | ON | 225 |
| H | low brightness | OFF | OFF | 215 | ns # ELECTRONIC DEVICE AND CONTROL METHOD FOR THE SAME

This application is a continuation of, and claims priority under 35 U.S.C. §120 to PCT/JP2009/065411, filed on Sep. 3, 2009, the entire contents of which is hereby incorporated by reference.

TECHNICAL FIELD

The present invention relates to an electronic device that is operated with power supplied from the outside and also to a control method for the same.

BACKGROUND ART

In recent years, manufacturers of electronic devices have been concerned about greenhouse gases that are emitted therefrom when they are manufactured and used.

Although amounts of gases emission from electronic devices when they are manufactured are a cause of concern, if electronic devices have high power consumption, since the amount of greenhouse gases that are emitted from the electronic devices throughout the course of their life is greater than the amount of greenhouse gases that are emitted when the electric devices are manufactured, the emission of greenhouse gases is a matter of serious concern.

To decrease amounts of greenhouse gases emission from electronic devices while they are used, the efficiency of computation processes for electronic devices has been improved and their operations have been controlled using sensing technologies so that their power consumption is reduced.

These technologies may be effective in reducing the amount based on normal operations of electronic devices. However, when use frequency of these devices is high or when the functions that are built into these devices are used at a high rate, a problem may arise in which the amount of greenhouse gases increases in proportion to hour of use. In addition, there is a problem in which the amount of greenhouse gases that are emitted largely depends on how they are used by their users.

Technologies that alert users to the environmental impact that devices may have throughout the course of the device's life are disclosed in JP2007-53433A Publication (hereinafter referred to as Patent Literature 1) and JP2001-356648A Publication (hereinafter referred to as Patent Literature 2).

The technology disclosed in Patent Literature 1 alerts the users to the environmental that devices may have throughout the course of the device's life and at each state at which the device is used such that he or she can easily understand and correctly recognize it. LCD 22 shown in FIG. 3 (B) presented in Patent Literature 1 displays amount of carbon dioxide ($CO_2$) emission for each manufacturing stage and each usage stage.

The technology disclosed in Patent Literature 2 collects information concerning the environmental impact through various types of sensors, computes the environmental impact, and causes its value to be shown not only to service persons but also to general users. Patent Literature 2 discloses that when a user presses a power consumption button of a device, power consumption data appears on a display section.

SUMMARY OF THE INVENTION

The technologies disclosed in Patent Literature 1 and Patent Literature 2 only cause the user to recognize that power consumption effects the environment when devices are actually used, but do not provide any guidance to the user on how to reduce power consumption. Thus, to reduce power consumption, the user has to refrain from using the device.

An exemplary object of the invention is to provide an electronic device and a control method of the same that will allow an operation that reduces the amount of a greenhouse gas emission to be selectable in its operation stage.

An electronic device according to an exemplary aspect of the invention includes an input acceptance section that accepts an input of a command that causes any one of a plurality of operation states to be selected; a function section that has a plurality of operation states that differ in power consumption and that operates in an operation state represented by the command that is input to the input acceptance section of the plurality of operation states; a storage section that pre-stores power consumption values corresponding to the plurality of operation states and a conversion factor, based on which, power consumption is converted into an amount of emitted greenhouse gas; and a control section that reads from the storage section a power consumption value corresponding to an operation state represented by the command that is input to the input acceptance section, multiplies the power consumption value that has been read by the conversion factor, obtains the multiplied result as the amount of the emitted greenhouse gas per unit time, and causes the obtained result to appear on a display section.

In addition, a control method for an electronic device according to an exemplary aspect of the invention is a control method for an electronic device that has an input acceptance section that accepts an input of a command that causes any one of a plurality of operation states to be selected, and a function section that has a plurality of operation states that differ in power consumption and that operates in an operation state represented by the command that is input to the input acceptance section of the plurality of operation states, the control method comprising: storing power consumption values corresponding to the plurality of operation states and a conversion factor, based on which, power consumption is converted into an amount of emitted greenhouse gas, in a storage section; reading from the storage section a power consumption value corresponding to an operation state represented by the command that is input to the input acceptance section; and multiplying the power consumption value that has been read by the conversion factor, obtaining the multiplied result as the amount of the emitted greenhouse gas per unit time and causing the obtained result to appear on a display section.

BRIEF DESCRIPTION OF DRAWINGS

FIG. 4 is a schematic diagram describing an operation of an operation state control section according to the first embodiment.

FIG. 5 shows operation states and device power consumption of individual functions stored in a main substrate.

BEST MODES THAT CARRY OUT THE INVENTION

With reference to the accompanied drawings, embodiments of the present invention will be described. In the following embodiments, electronic devices will be described as projection type display devices.

First Embodiment

Figure 1:
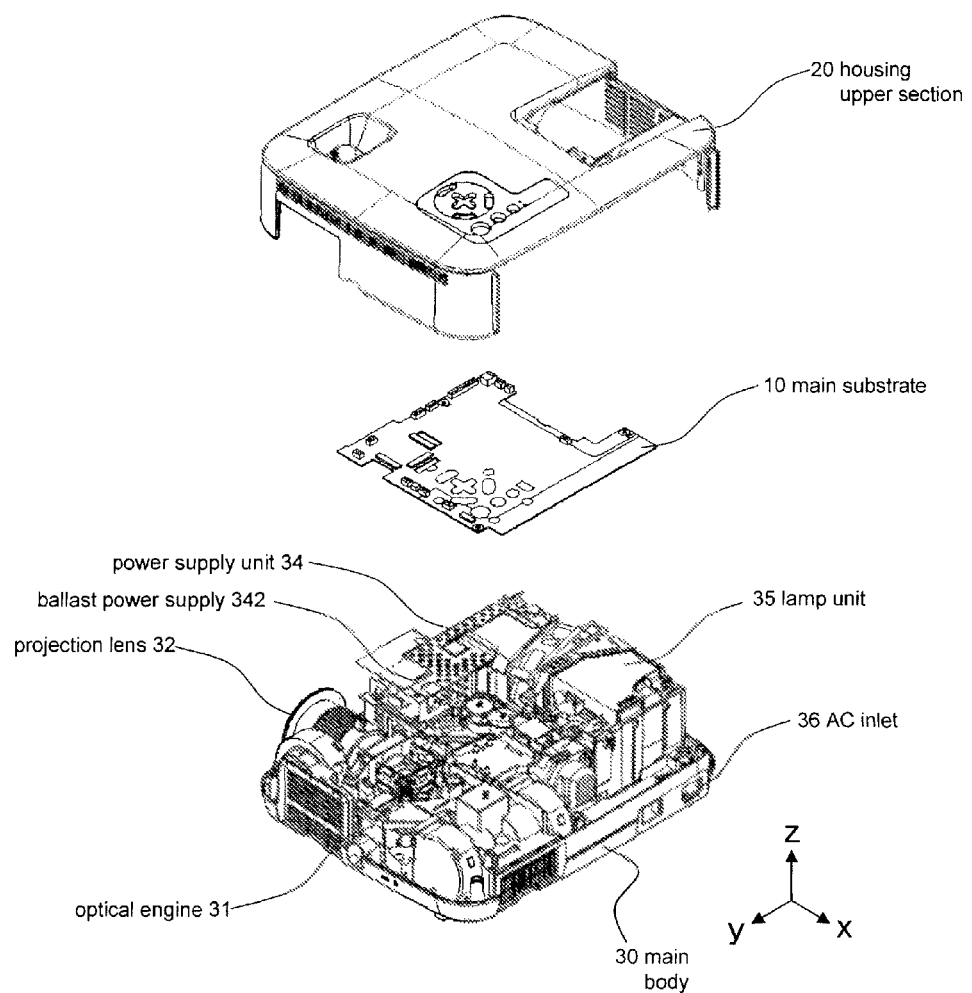
FIG. 1 is a perspective view showing a projection type display device according to a first embodiment.

Here, the structure of a projection type display device according to this embodiment will be described. FIG. 1 is a perspective view showing a projection type display device according to this embodiment.

Figure 2:
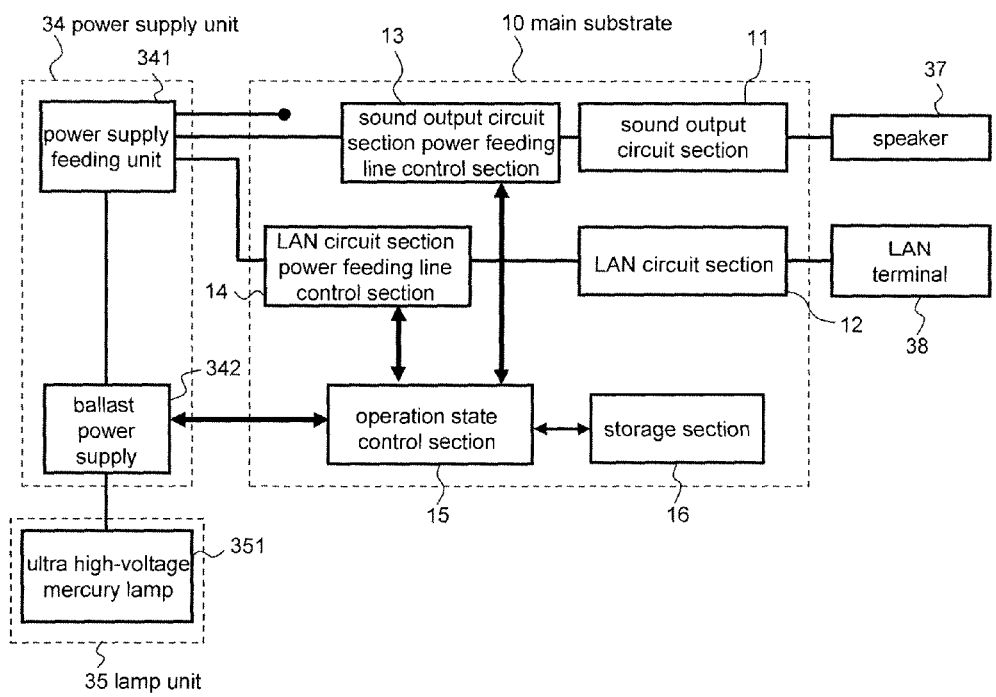
FIG. 2 is a block diagram showing an example of a principal structure that executes power control for the projection type display device according to the first embodiment.

FIG. 1 is an exploded perspective rear view showing that housing upper section 20 and main substrate 10 have been removed from main body 30 of the projection type display device. FIG. 2 is a block diagram showing an example of the structure of the main substrate, a power supply unit, and a lamp unit. A method for a process according to this embodiment is principally executed by main substrate 10, power supply unit 34, and lamp unit 35.

As shown in FIG. 1, the projection type display device is provided as a principal internal structure with main substrate 10, power supply unit 34, lamp unit 35, optical engine 31, and projection lens 32. In the projection type display device, AC power is supplied to main body 30 through AC inlet 36. The projection type display device is also provided with a speaker (not shown) that outputs sound and a LAN (Local Area Network) terminal 38 that are used for connection to a communication line such as the Internet.

As shown in FIG. 2, power supply unit 34 has power supply feeding section 341 and ballast power supply 342. External power is supplied to power supply feeding section 341 through AC inlet 36 such that power is stably supplied to main substrate 10 and ballast power supply 342. Ballast power supply 342 supplies power to ultra high-voltage mercury lamp 351 provided in lamp unit 35 so that a lamp stably emits light. The emitted light passes through optical engine 31 and it generates an image corresponding to an image signal and projects the image in the forward direction through projection lens 32.

Besides an image signal generation section (not shown) that generates an image signal corresponding to an external signal, main substrate 10 has sound output circuit section 11 that drives speaker 37 corresponding to a sound signal; LAN circuit section 12 that controls communication of information that is transmitted and received through LAN terminal 38 and a communication line; sound output circuit section power feeding line control section (hereinafter referred to as sound output power feeding control section) 13; LAN circuit section power feeding line control section (hereinafter referred to as communication power feeding control section) 14; operation state control section 15 that controls sound output power feeding control section 13 and communication power feeding control section 14; and storage section 16 connected to operation state control section 15.

The structure including the image signal generation section (not shown), optical engine 31, and projection lens 32 corresponds to a display section of the projection type display device.

Storage section 16 pre-stores information of a table that shows a power consumption reference value, a $CO_2$ emission factor, and power consumption corresponding to operation states of individual functions. The power consumption reference value is a power consumption value corresponding to an amount of emitted greenhouse gas that becomes a basis for comparing increases or decreases at in the amount of the greenhouse gas that is emitted. The power consumption reference value may be power consumption of a current operation state or power consumption in an ordinary operation method for the projection type display device. The $CO_2$ emission factor corresponds to a conversion factor based on which power is converted into an amount of $CO_2$ emission. Hereinafter, the table that shows that power consumption corresponding to operation states of individual functions is referred to as the power consumption table.

Operation state control section 15 is connected to sound output control section 13, communication power feeding control section 14, and ballast power supply 342 through respective signal lines. Operation state control section 15 transmits control signals to sound output power feeding control section 13, communication power feeding control section 14, and ballast power supply 342 so as to control the operations of these three functions. Operation state control section 15 controls ballast power supply 342 so as to change the output of ultra high-voltage mercury lamp 351. For example, assuming that the LAN function has been set to "OFF," operation state control section 15 transmits a control signal to communication power feeding control section 14 that causes power feeding to LAN circuit section 12 to be turned off.

Sound output power feeding control section 14 is provided between a power reception line of sound output circuit section 11 and a power transmission line of power supply feeding section 341 and changes over between the ON and OFF states of power feeding to sound output circuit section 11 corresponding to a command issued by operation state control section 15. Communication power feeding control section 14 is provided between the power reception line of LAN circuit section 12 and the power transmission line of power supply feeding section 341 and changes over between the ON and OFF states of the power feeding to LAN circuit section 12 corresponding to a command issued by operation state control section 15. Ballast power supply 342 changes a lamp output corresponding to a control signal received from operation state control section 15 while keeping light emitted from ultra high-voltage mercury lamp 351 stable.

Operation state control section 15 is provided with memory (not shown) that stores a program; and a CPU (Central Processing Unit) (not shown) that executes a process corresponding to the program. The operation states of the foregoing three functions, which are the light source output change function, communication function, and sound output function, are changed in such a manner that the CPU (not shown) executes the program. On the other hand, the operation states of the individual functions are selected or changed corresponding to a command that is input by the user in such a manner that a CPU (not shown) provided in main substrate 10 executes a main software program. As an example of the process, when the user inputs a command that causes a menu screen on which he or she changes an operation state to appear to the projection type display device, a setup menu is displayed on the screen.

Hereinafter, for simplicity, it is assumed that content relating to the control method according to this embodiment of the main software program, for example, such as a setup menu screen invoking process, is pre-written in a program that the CPU of operation state control section 15 executes. Thus, when the menu screen invoking command is input, operation state control section 15 displays the setup menu.

According to this embodiment, although the CPU that executes the main software program is provided along with the CPU provided in operation state control section 15, one CPU may execute both the program for the control method according to this embodiment and the main software program. Alternatively, the program for the control method according to this embodiment may be integrated into the main software program.

Next, an example of the setup menu on which the user changes the operation state of each function will be described.

Figure 3:
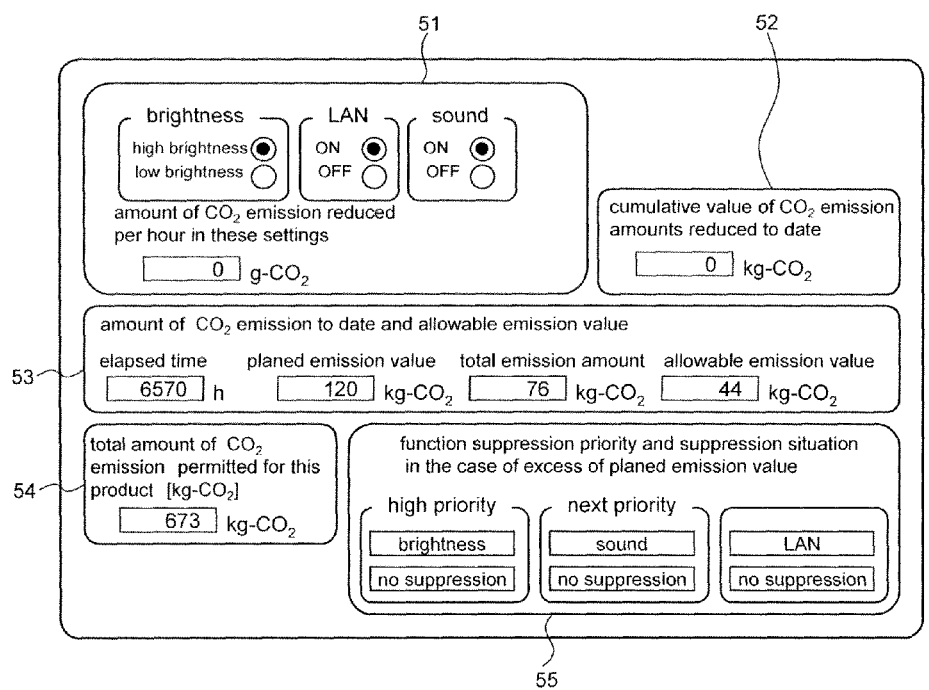
FIG. 3 shows an example of a setup menu of the projection type display device according to the first embodiment.

FIG. 3 is a schematic diagram showing an example of the setup menu that appears on the projection screen. As shown in FIG. 3, the setup menu shows not only the device's setup state, but information of amounts of $CO_2$ emission computed by arithmetic operations. Thus, although the setup menu is also referred to as the $CO_2$ emission amount menu, here, the menu screen shown in FIG. 3 is referred to as the setup menu and information about settings of the device will be mainly described.

The setup menu has function setup window 51, cumulative value output window 52, progress output window 53, allowable value output window 54, and function suppression priority setup window 55. Since function suppression priority setup window 55 will be presented in a second embodiment that follows, its detailed description will be omitted in this embodiment.

Function setup window 51 indicates a plurality of operation states for "brightness" corresponding to the lamp output function, for "LAN" corresponding to the communication function, and for "sound" corresponding to the sound output function. "Brightness" has two operation states of high brightness and low brightness. "LAN" and "sound" each has two operation states of ON and OFF.

Each of the plurality of operation states of individual functions is followed by a concentric circle. The concentric circle denotes the operation state in such a manner that when the inner circle is black, the corresponding operation state has been selected; when the inner circle is white, the corresponding operation state has not been selected.

Function setup window 51 shown in FIG. 3 denotes that the inner circle corresponding to "high brightness" in "brightness" has been set to black, the inner circle corresponding to "ON" in "LAN" has been set to black, and the inner circle corresponding to "ON" in "Sound" has been set to black. They denote that the output of ultra high-voltage mercury lamp 351 has been set to "high brightness," the LAN function of LAN circuit section 12 has been set to the ON state, and the sound output of sound output circuit section 11 has been set to the ON state.

When one of circles corresponding to operation states of individual functions that appear on function setup window 51 is set to black, the operation state corresponding to the black inner circle is set. The setup screen is caused to appear on the projection screen and an inner circle corresponding to an operation state is set to black by operating cursor keys provided on a control panel (not shown) of housing upper section 20 or by cursor keys provided on a remote controller (not shown). The control panel or remote controller corresponds to an input acceptance section.

Function setup window 51 indicates how much the amount of $CO_2$ emission is reduced per hour corresponding to the operation states of the individual functions. Cumulative value output window 52 indicates the cumulative value of the amounts of $CO_2$ emission.

Next, the process and operation of operation state control section 15 provided in the main substrate will be described. FIG. 4 is a schematic diagram describing the operation of the operation state control section. In FIG. 4, information stored in storage section 16 is represented in an area surrounded by dashed lines.

Operation state control section 15 computes an amount of $CO_2$ emission per predetermined period and the cumulative value thereof. According to this embodiment, amounts of $CO_2$ emission are computed by two methods. The two methods are categorized as a method that computes an increased/ decreased $CO_2$ emission amount and a method that computes an amount of $CO_2$ emission itself. In the method that computes an increased/decreased $CO_2$ emission amount, it is computed as a comparative value that denotes the amount by which a $CO_2$ emission increase or decreases from the amount of a $CO_2$ emission that corresponds to the power consumption reference value.

The process that uses the method that computes an increased/decreased $CO_2$ emission amount is represented as step 1100 shown at a lower left frame of FIG. 4 and this process is referred to as the increased/decreased emission amount computation process. In contrast, the process that uses the method that computes an amount of $CO_2$ emission itself is represented as step 1200 shown at the lower right frame of FIG. 4 and this process is referred to as the emission amount computation process.

Next, a procedure that is common to these two processes and on which they are based will be described.

When the power of the projection type display device according to this embodiment is turned on, operation state control section 15 stores setup information of the operation state of each function (step 1001). The projection type display device according to this embodiment is provided with three functions, which are the lamp output change function, sound output function, and LAN function. The lamp output change function has two options with respect to brightness that are "low brightness" and "high brightness." Each of the sound output function and LAN function has options that are "ON" and "OFF." The default value of the brightness has been set to "high brightness," that of the sound output function has been set to "ON," and that of the LAN function has been set to "ON."

Operation state control section 15 detects the operation state of each function (step 1002). Although this operation can be performed at any period, according to this embodiment, the detection period is one minute. Unless the user changes the operation state of each function, it has been set to the default value. As described above, the brightness of the lamp has been set to "high brightness," the LAN function has been set to "ON," and the sound output function has been set to "ON." Operation state control section 15 refers to the power consumption table pre-stored in storage section 16 and reads a power consumption value corresponding to detection information that is information of the detected result of the operation state of each function from the power consumption table (step 1003). In addition, operation state control section 15 reads the power consumption reference value and the $CO_2$ emission factor from storage section 16 (step 1003).

FIG. 5 shows an example of the power consumption table stored in the storage section. Since the lamp output change function, LAN function, and sound output function each have two options, there are a total of eight combinations of options of functions. FIG. 5 shows that the combinations are denoted by A to H and that operation states of individual functions are correlated with power consumption values. Referring to FIG. 5, power consumption corresponding to the default values of the operation states of the individual functions is 325 W. Hereinafter, the combinations A to H shown in FIG. 5 are referred to as device operation states A to H, respectively.

Followed by step 1003, operation state control section 15 executes the increased/decreased emission amount computation process at step 1100 or the emission amount computation process at step 1200. Thereafter, when the user inputs the setup menu invoking command, operation state control section 15 causes the computed result to appear (step 1500).

According to this embodiment, operation state control section 15 detects the operation state of each function at step 1002, recognizes the device operation state based on the operation state of each function, and reads power consumption corresponding to the recognized device operation state from the power consumption table. It should be noted that power consumption can be decided in another method other than the foregoing method. For example, when the operation state of each function is set to the default value or set by the user at step 1001, operation state control section 15 records the operation state as one of operation states A to H shown in FIG. 5 to storage section 16. In this alternative method, at step 1002, when operation state control section 15 refers to information of the device operation state recorded in storage section 16, it can recognize the device operation state as one of device operation states A to H and read power consumption corresponding to the recognized device operation state from the power consumption table without need to detect the operation state of each function. In this alternative method, the same purpose as the foregoing method that detects the operation state of each function can be achieved.

Figure 6:
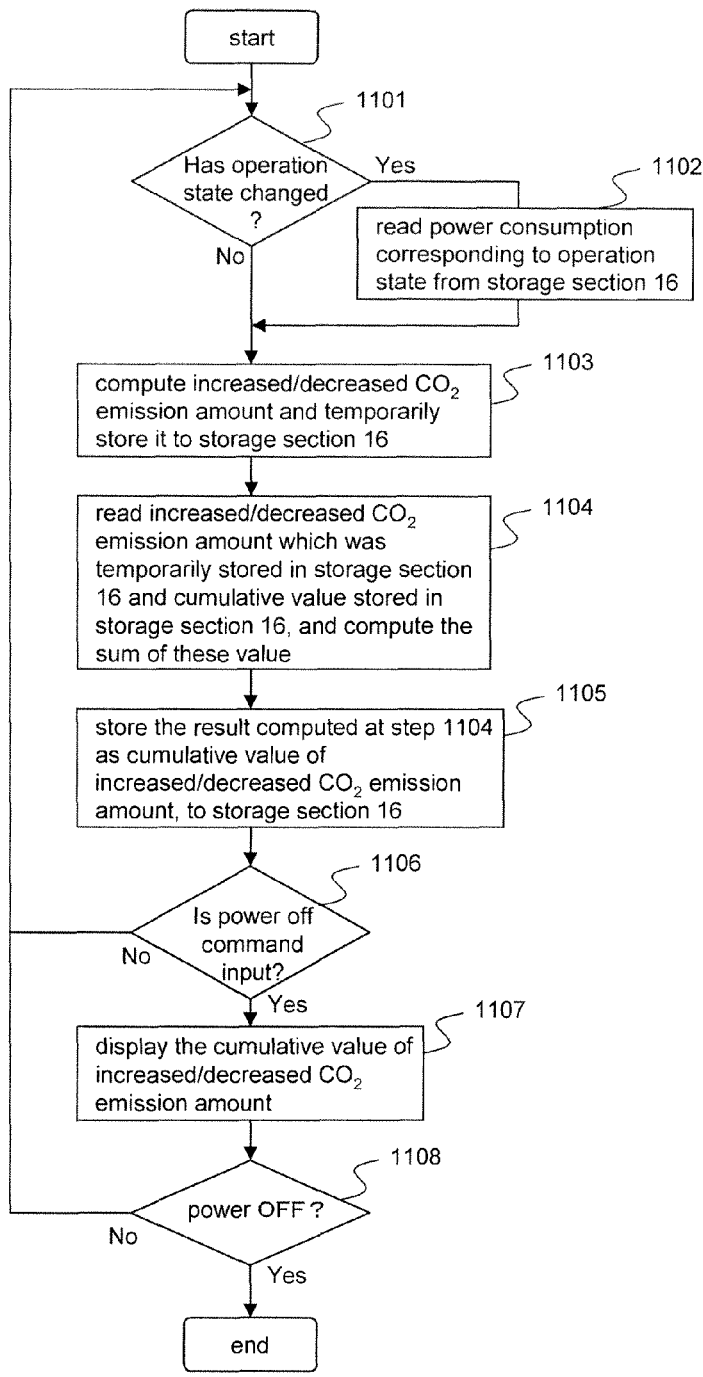
FIG. 6 is a flow chart showing a procedure of an increased/decreased emission amount computation process shown in FIG. 4.

Next, the increased/decreased emission amount computation process at step 1100 of the foregoing two computation methods for amounts of $CO_2$ emission will be described. FIG. 6 is a flow chart showing a procedure of the increased/decreased emission amount computation process shown in FIG. 4.

When operation state control section 15 detects the operation state of each function at step 1002 shown in FIG. 4, operation state control section 15 determines whether or not the operation state is the same as the operation state that has been detected (step 1101). If the current operation state is different from the operation state that has been detected, operation state control section 15 reads power consumption corresponding to the current operation state from the power consumption table (step 1102) and then advances to step 1103 of the process. If the current operation state is the same as the state that has been detected, since operation state control section 15 does not need to read a power consumption value corresponding to the operation state therefrom, operation state control section 15 directly advances to step 1103.

At step 1103, operation state control section 15 computes an amount of $CO_2$ emission based on the power consumption corresponding to the operation state of each function, the $CO_2$ emission factor, and the power consumption reference value and stores the computed value to storage section 16. At this point, if the power consumption value corresponding to the detected operation state of each function is lower than the power consumption reference value, operation state control section 15 records the computed amount of $CO_2$ emission as a reduction amount to storage section 16; if the power consumption value corresponding to the detected operation state of each function is greater than the power consumption reference value, operation state control section 15 records the computed amount of $CO_2$ emission as an increase amount thereto. As an example of a method that separately records a reduction amount and an increase amount, when a reduction amount is managed as a plus value, if the computed amount of $CO_2$ emission is a reduction amount, a plus sign is added to the computed amount of $CO_2$ emission; if it is an increase amount, a minus sign is added thereto.

In addition, if a cumulative value has been stored in storage section 16, operation state control section 15 computes the sum of the amount of $CO_2$ emission computed at step 1103 and the cumulative value stored in storage section 16 (step 1104). Thereafter, operation state control section 15 stores the result computed at step 1104 as a new cumulative value to storage section 16 (step 1105).

When the user inputs a power off command to the device (step 1106), operation state control section 15 causes the cumulative value of increased/decreased $CO_2$ emission amounts to appear (step 1107). In contrast, unless the user inputs the power off command, operation state control section 15 returns to step 1002 of the process at an elapsed time of one minute after step 1002 shown in FIG. 4.

Figure 7:
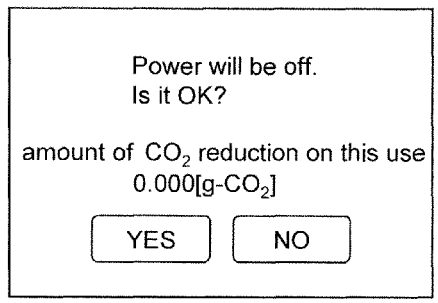
FIG. 7 shows an example of an image that appears when the user inputs a command that causes the power to be turned off.

FIG. 7 is an example of an image that appears when the user inputs the power off command. As shown in FIG. 7, in addition to a message that causes the user to confirm whether or not to turn off the power, a $CO_2$ emission value appears on the screen. In addition, selection buttons that cause the power to be turned off appear in the image.

If the user selects "YES" of the selection buttons that appear on the screen (step 1108), operation state control section 15 turns off the power; if he or she selects "NO" of the selection buttons, operation state control section 15 returns to step 1002 shown in FIG. 4.

In the example of the screen shown in FIG. 7, the cumulative value of amounts of $CO_2$ emission is zero. As described above, in the case that if the computed amount of $CO_2$ emission is a reduction amount, a plus sign is added thereto and if the computed amount of $CO_2$ emission is an increase amount, a minus sign is added thereto, a plus cumulative value represents an amount of $CO_2$ reduction, while a minus cumulative value represents an amount of $CO_2$ increased.

When the cumulative value is a plus value, the value can be indicated on the screen shown in FIG. 7. As a result, the user can easily recognize the indicated cumulative value as an amount of $CO_2$ reduction. In contrast, when the cumulative value is a minus value, if the value is indicated on the screen as shown in FIG. 7, a value with a minus sign is indicated as an amount of $CO_2$ reduction appears. In this case, an absolute cumulative value may be indicated with "No reduction of $CO_2$ emission in this time, but increased amount of $CO_2$ emission from reference value" instead of "amount of $CO_2$ reduction in this time." In addition, if a value with a minus sign is indicated as an amount of $CO_2$ reduction, since the user may not easily understand it, because the amount of $CO_2$ reduction is zero, value "0" might appear on the screen.

Here, a specific example will be described. It is assumed that individual functions have been set to their default value.

At step 1103, operation state control section 15 computes an increased/decreased $CO_2$ emission amount for the period based on information of power consumption corresponding to device operation state A=325 W, power consumption reference value=325 W, $CO_2$ emission factor=0.42 g-$CO_2$/Wh. In this example, since both the power consumption corresponding to the device operation state and to the power consumption reference value are the same, 325 W, the increased/decreased $CO_2$ emission amount per hour can be computed as follows. Increased/decreased $CO_2$ emission amount=(power consumption reference value−power consumption corresponding to device operation state)×$CO_2$ emission factor= (325−325)×0.42=0 g. In this case, an increased/decreased $CO_2$ emission amount per minute is also "0 g."

Assuming that the cumulative value stored in storage section 16 is 0 g, even if the device operates and the time elapses, since the increased/decreased $CO_2$ emission amount computed at step 1103 is 0 g, the cumulative value computed at step 1104 is also 0 g.

This cumulative value appears not only on the screen when the power is turned off, but also on the setup menu screen. The setup menu screen shown in FIG. 3 indicates the cumulative value on cumulative value output window 52 at an upper pane of the setup menu. In this example, since the maximum value of the power consumption of the device has been set as the power consumption reference value, the increased/decreased $CO_2$ emission amount is "0 g" or a reduction amount is computed. Thus, cumulative value output window 52 shows the expression "reduced." Since function setup window 51 shown in FIG. 3 indicates an amount of $CO_2$ reduction per hour in the case in which the device is used in the settings that appear on the window, expression "can be reduced" is used. The user who sees reduction amount "0 g" might have a motivation to raise the reduction amount and change the current operation state to another operation state.

Here, several examples of amounts of $CO_2$ reduction that appear on function setup window 51 will be described. An amount of $CO_2$ reduction that appears on function setup window 51 is computed as follows. When the user inputs the setup screen invoking command to the device, operation state control section 15 checks the device operation state that has been set up, computes an amount of $CO_2$ reduction per hour corresponding to the device operation state, and causes the computed amount of $CO_2$ reduction to appear on function setup window 51.

Figure 8A:
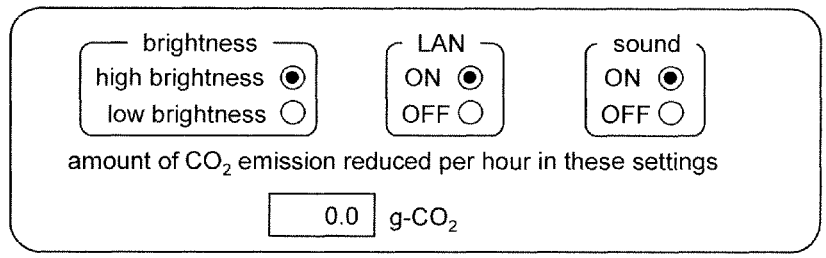
FIG. 8A shows an example of the amounts of $CO_2$ reduction that appears on a screen and that differ in device operation states when a power consumption reference value is 325 W.
Figure 8B:
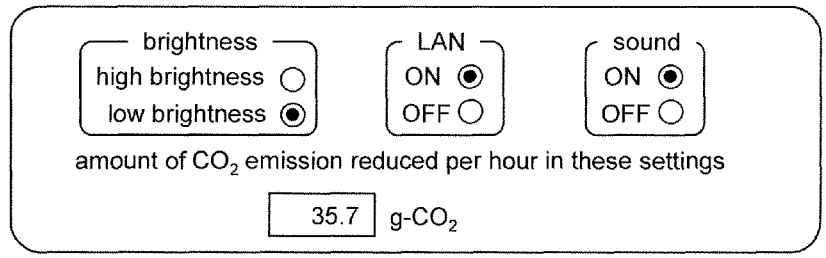
FIG. 8B shows an example of the amounts of $CO_2$ reduction that appears on a screen and that differ in device operation states when the power consumption reference value is 325 W.
Figure 8C:
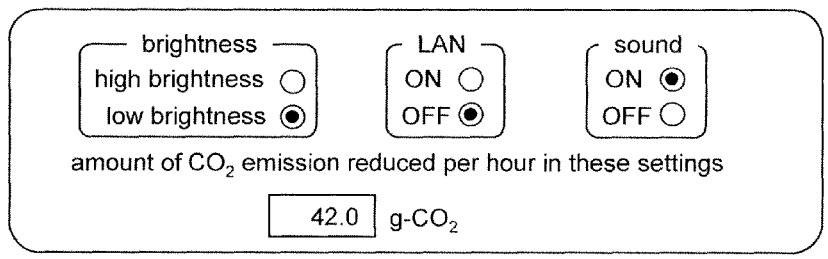
FIG. 8C shows an example of the amounts of $CO_2$ reduction that appears on a screen and that differ in device operation states when the power consumption reference value is 325 W.

FIG. 8A to FIG. 8C show examples of the amounts of $CO_2$ reduction that appear on the screen and that differ in device operation states. FIG. 8A shows an example of the amount of $CO_2$ reduction that appears on the screen and that corresponds to device operation state A shown in FIG. 5; FIG. 8B shows an example of the amount of $CO_2$ reduction that appears on the screen and that corresponds to device operation state E; and FIG. 8C shows an example of the amount of $CO_2$ reduction that appears on the screen and that corresponds to the device operation state G shown in FIG. 5. In this example, it is assumed that power consumption=325 W that corresponds to the device operation state A is the power consumption reference value.

As shown in FIG. 8A, if the brightness has been set to "high brightness," if the LAN function has been set to "ON," and if the sound output has been set to "ON", the amount of $CO_2$ emission that can be reduced per hour appears as "0 g" on the screen. As shown in FIG. 8B, if the brightness has been set to "low brightness" and the settings of other functions are the same as those of FIG. 8A, the amount of $CO_2$ emission that can be reduced per hour becomes (325−240)×0.42=35.7 g.

As shown in FIG. 8C, if only the setting of the sound output is the same as that of FIG. 8A, if the brightness has been set to "low brightness," and if the LAN function has been set to "OFF," the amount of $CO_2$ emission that can be reduced per hour becomes (325−225)×0.42=42.0 g.

Since the user of the device can refer to the setup menu and decide the device operation state in consideration of the purpose for the use of the device and the amount of $CO_2$ reduction, he or she can reduce the amount of $CO_2$ emission without causing any inconvenience to the user using the device.

Next, the appearance of an amount of $CO_2$ reduction on function setup window 51 in the case in which the power consumption reference value corresponding to the device operation state C shown FIG. 5, 310 W, will be described. Since timings of the process performed in operation state control section 15 is the same as those shown in FIG. 8A to FIG. 8C, a detailed description will be omitted.

Figure 9A:
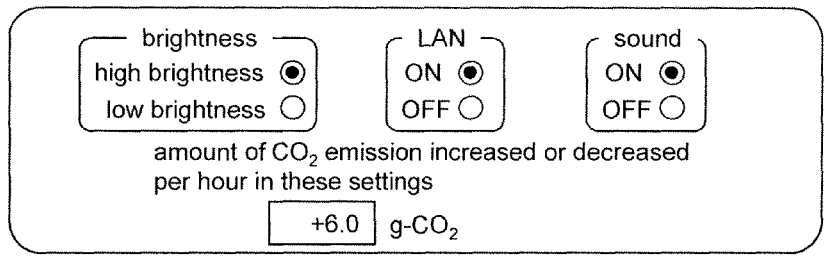
FIG. 9A shows an example of the amounts of $CO_2$ reduction that appears on a screen and that differ in device operation states when a power consumption reference value is 310 W.
Figure 9B:
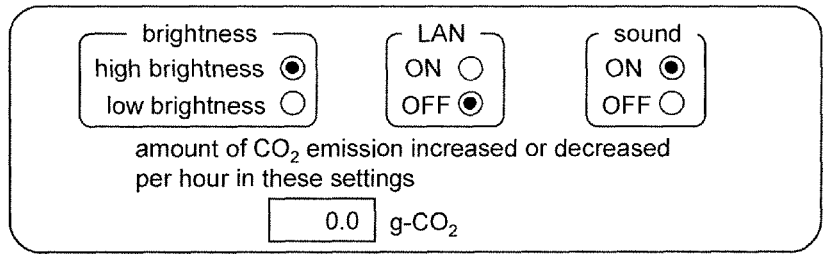
FIG. 9B shows an example of the amounts of $CO_2$ reduction that appears on a screen and that differ in device operation states when the power consumption reference value is 310 W.
Figure 9C:
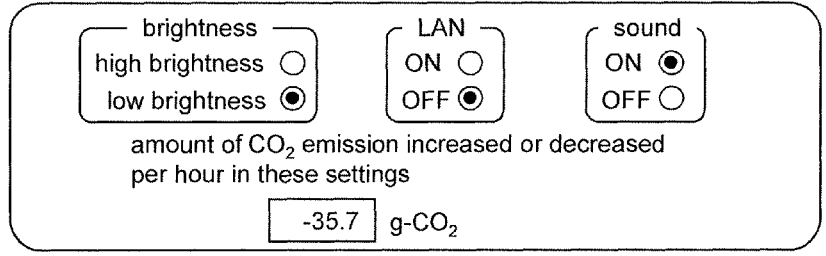
FIG. 9C shows an example of the amounts of $CO_2$ reduction that appears on a screen and that differ in device operation states when the power consumption reference value is 310 W.

FIG. 9A to FIG. 9C show examples amounts of $CO_2$ reduction that appears on the screen and that differ in the device operation states. FIG. 9A shows an example of the amount of $CO_2$ reduction that appears on the screen and that corresponds to the device operation state A shown in FIG. 5; FIG. 9B shows an example of the amount of $CO_2$ reduction that appears on the screen and that corresponds to the device operation state C shown in FIG. 5; and FIG. 9C shows an example of the amount of $CO_2$ reduction that appears on the screen and that corresponds to the device operation state G shown in FIG. 5.

As shown in FIG. 9A, if the brightness has been set to "high brightness," if the LAN function has been set to "ON," and if the sound output has been set to "ON," since they correspond to device operation state A, power consumption becomes 325 W. Operation state control section 15 computes an increased/decreased $CO_2$ emission amount per hour as (power consumption corresponding to device operation state−power consumption reference value)×$CO_2$ emission factor=(325−310)×0.42=+6.3 g based on the power consumption corresponding to the device operation state A=325 W, power consumption reference value=310 W, and $CO_2$ emission factor=0.42 g−$CO_2$/Wh. Thereafter, operation state control section 15 causes an increased/decreased $CO_2$ emission amount to appear on the screen as shown in FIG. 9A.

"+" sign of an amount of $CO_2$ emission denotes that the amount of $CO_2$ emission increases from the reference value. In contrast, "−" sign of an amount of $CO_2$ emission denotes that the amount of $CO_2$ emission decreases from the reference value. Thus, function setup window 51 shown in FIG. 9A indicates expression "increased or decreased" including not only the case in which the amount of $CO_2$ emission decreases from the reference value, but the case in which the amount of $CO_2$ emission increases from the reference value.

As shown in FIG. 9B, if the LAN function has been set to "OFF" and if the settings of the other functions have been the same as those shown in FIG. 9A, the device will have been set to the device operation state C. In this case, since the power consumption corresponding to the device operation state C is equal to the power consumption reference value, the increased/decreased $CO_2$ emission amount per hour becomes "0 g."

As shown in FIG. 9C, if only the sound output has been set to "ON" that is the same setting as that shown in FIG. 9A, the brightness has been set to "low brightness," and the LAN function has been set to "OFF," operation state control section 15 computes an increased/decreased $CO_2$ emission amount per hour as (225−310)×0.42=−35.7 g. Thereafter, operation state control section 15 causes the increased/decreased $CO_2$ emission amount per hour to appear on the screen as shown in FIG. 9C.

The user of the device can easily recognize the appearance on the screen shown in FIG. 9C as a reduction of an amount of $CO_2$ emission, whereas the appearance on the screen shown in FIG. 9A can convey a strong impression to the user of the amount of the $CO_2$ emission increase. Thus, the user might be motivated to change the device operation state to another operation state having lower power consumption and thereby the reduction of the amount of $CO_2$ emission substantially rises.

Although FIG. 8A to FIG. 8C and FIG. 9A to 9C show reduced, increased, or decreased amount of $CO_2$ emission per hour, the computation period for amount of $CO_2$ emission may be other than one hour. Thus, the computation period for amount of $CO_2$ emission may be one minute that is the operation state detection period.

If an amount of $CO_2$ emission increases from the reference value shown in FIG. 9A, the amount of $CO_2$ emission that appears on function setup window 51 may have a value of zero. As a result, a method that contributes to the reduction of an amount of $CO_2$ emission can be strongly impressed on the user.

Figure 10:
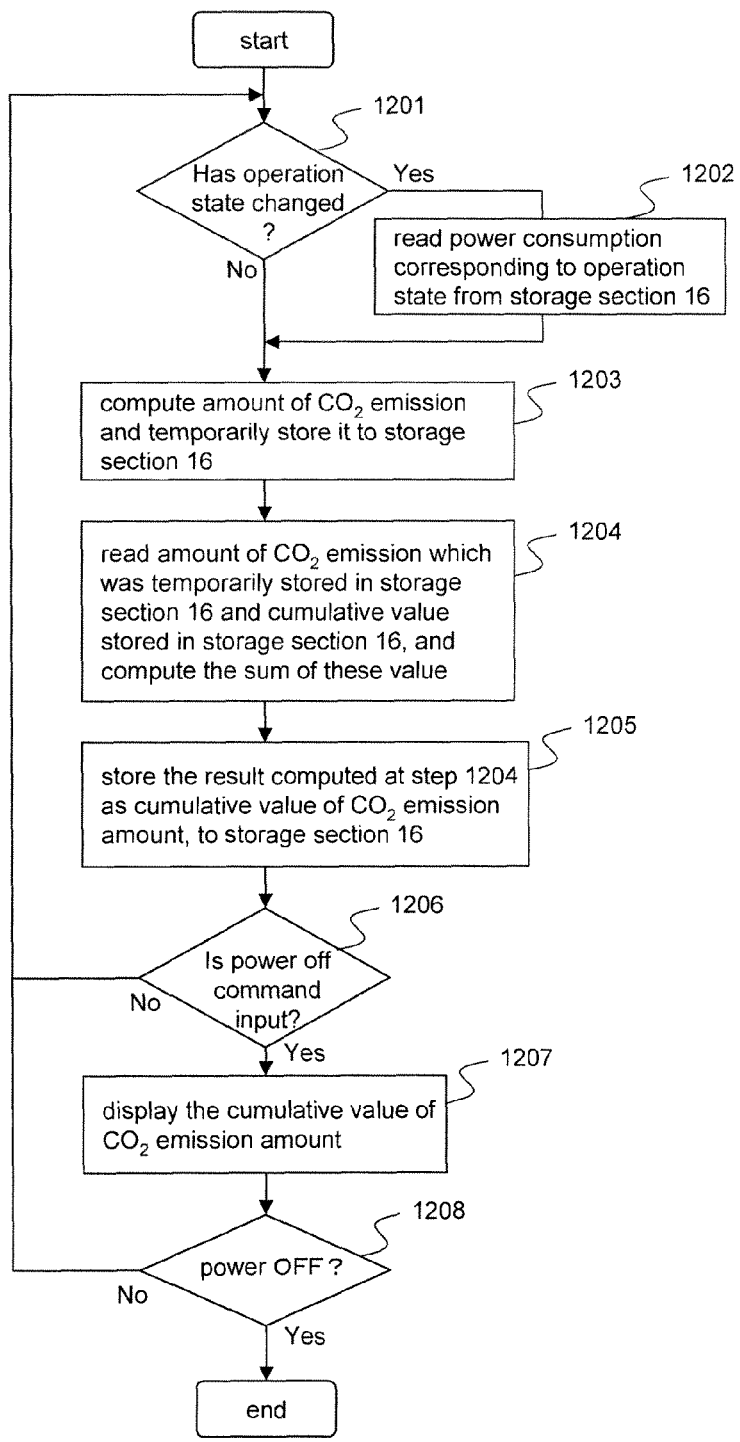
FIG. 10 is a flow chart showing a procedure of the emission amount computation process shown in FIG. 4.

Next, the procedure of the emission amount computation process at step 1200 shown in FIG. 4 will be described. FIG. 10 is a flow chart showing the procedure of the emission amount computation process shown in FIG. 4.

When operation state control section 15 detects the operation state of each function at step 1002 shown in FIG. 4, operation state control section 15 determines whether or not the operation state of each function is the same as the operation state that has been detected (step 1201). If the current operation state is different from the operation state that has been detected, operation state control section 15 reads power consumption corresponding to the current operation state from the power consumption table (step 1202) and then advances to step 1203 of the process. In contrast, at step 1201, if the current operation state is the same as the operation state that has been detected, since operation state control section 15 does not need to read the value of the power consumption corresponding to the operation state, operation state control section 15 directly advances to step 1203 of the process.

At step 1203, operation state control section 15 computes an amount of $CO_2$ emission based on the power consumption corresponding to the operation state of each function and the $CO_2$ emission factor and stores the computed amount of $CO_2$ emission in storage section 16. In addition, operation state control section 15 computes the sum of the amount of $CO_2$ emission computed at step 1203 and the cumulative value stored in storage section 16 (step 1204). Thereafter, operation state control section 15 stores the computed result of step 1204 as a new cumulative value to storage section 16 (step 1205).

When the user inputs the power off command to the device (step 1206), operation state control section 15 causes the cumulative value of $CO_2$ emission amounts to appear (step 1207). Unless the user inputs the power off command, operation state control section 15 returns to step 1002 of the process at an elapsed time of 1 minute after step 1002 shown in FIG. 4.

In this case, when the user inputs the power off command to the device, an image that includes "amount of $CO_2$ emission" instead of "amount of $CO_2$ reduction" appears on the screen. If the user selects "YES" from among the selection buttons that appears on the screen (step 1208), operation state control section 15 turns off the power; if he or she selects "NO" from among the selection buttons, operation state control section 15 returns to step 1002 shown in FIG. 4.

Here, a specific example will be described. In this example, it is assumed that individual functions have been set to their default value.

At step 1203, operation state control section 15 computes an amount of $CO_2$ emission for the period based on power consumption corresponding to device operation state A=325 W, $CO_2$ emission factor=0.42 g−$CO_2$/Wh, and detection period=1 minute. As a result, operation state control section 15 obtains amount of $CO_2$ emission per minute=power consumption corresponding to device operation state×(detection period/60)×$CO_2$ emission factor=325×(1/60)×0.42=2.3 g.

Thereafter, at step 1204, operation state control section 15 computes the sum of the cumulative value stored in storage section 16 and 2.3 g computed at step 1203 and stores the computed result as a new cumulative value to storage section 16. The cumulative value appears not only on the screen when the power is turned off, but also on cumulative value output window 52 of the setup menu screen shown in FIG. 3.

When the user of the device sees the cumulative value of the $CO_2$ emission amount, he or she might be motivated to reduce the amount of $CO_2$ emission and to change the current operation state of each function to another operation state.

Alternatively, the user might operate the device to cause the setup menu screen to appear and then input a command that causes the operation state of function setup window 51 to change such that operation state control section 15 causes the amount of $CO_2$ emission per unit time to appear on the screen as shown in FIG. 8A to FIG. 9C. In this case, "amount of $CO_2$ emission per hour" appears on the screen instead of "amount of $CO_2$ reduction per hour." Thus, the user can refer to the setup menu and decide the operation state of the device taking into account both using of the device and the amount of $CO_2$ emission. As a result, the user can achieve a reduction of the amount of $CO_2$ emission without causing any inconvenience to the user using the device.

As described above, since the user is instructed how to use the device and since the cumulative value of $CO_2$ emission amounts is caused to appear on the screen, he or she is motivated to change the current operation state of each function to another operation state. As a result, since the user of the device can change the operation state of each function to another operation state with lower power consumption, the amount of $CO_2$ emission can be reduced.

Second Embodiment

This embodiment is a method that suppresses an amount of $CO_2$ emission in the case where it continuously rises since the frequency of use of the projection type display device described in the first embodiment is high or where the operation state of the projection type display device is not changed although the method according to the first embodiment is executed.

According to this embodiment, since a predetermined upper limit value of $CO_2$ emission amounts is pre-registered on the projection type display device before it is sold, if the amount of $CO_2$ emission exceeds the upper limit value, the projection type display device forcibly suppresses each function or prohibits the user from using the device such that when the planned service life of the device expires, the total amount of $CO_2$ emission will not exceed the upper limit value. According to this embodiment, the cumulative value of $CO_2$ emission amounts computed at step 1205 of the flow chart shown in FIG. 10 is used.

Figure 11:
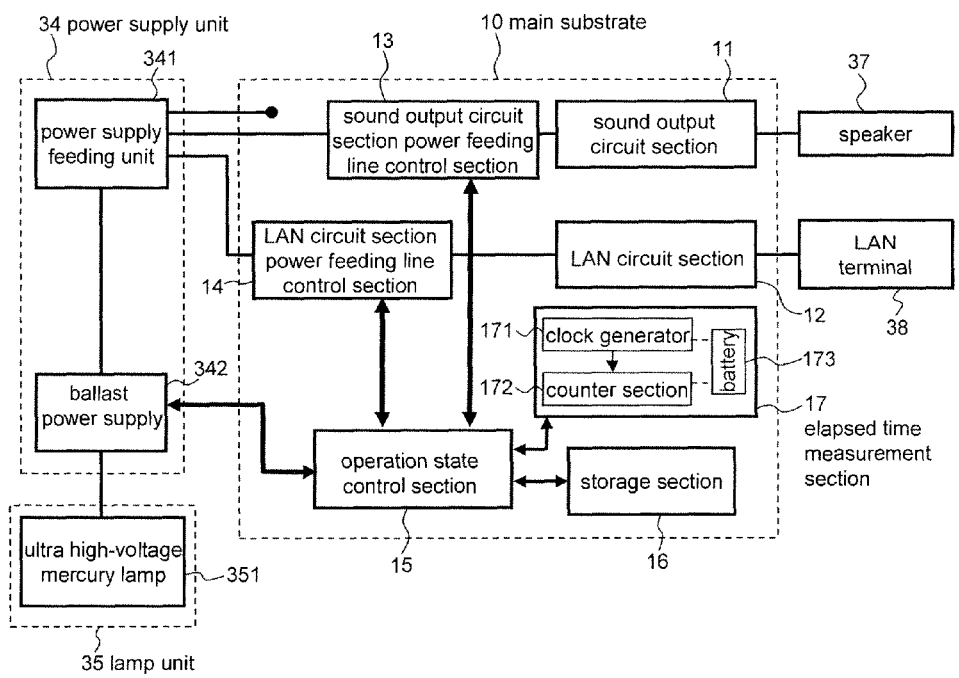
FIG. 11 is a block diagram showing an example of a principal structure that executes power control in a projection type display device according to a second embodiment.

Next, the structure of the projection type display device according to this embodiment will be described. FIG. 11 is a block diagram showing an example of a principal structure that executes power control for the projection type display device according to this embodiment.

As shown in FIG. 11, the principal structure with respect to the power control according to this embodiment is the same as that shown in FIG. 2 except that the former is provided with elapsed time measurement section 17. Thus, in this embodiment, detailed description for a structure similar to that of the first embodiment will be omitted; only the structure and operation that are different from those of the first embodiment will be described in detail.

According to this embodiment, main substrate 10 is provided with elapsed time measurement section 17. Elapsed time measurement section 17 has clock generator 171 that generates a clock signal at a constant period; counter section 172 that counts the clock signal that is input from clock generator 171; and battery 173 that supplies power to clock generator 171 and counter section 172 while the device is turned off. Counter section 172 converts the count of the clock signal into a corresponding time and measures an elapsed time after the beginning of the use of the device. Battery 173 is connected to power supply feeding section 341 through a wire (not shown) and is charged while the power of the device is turned on.

While power of the device is turned off, clock generator 171 and counter section 172 continuously operate with power supplied from battery 173 and measures an elapsed time even while the user does not use the device.

Storage section 16 has stored data of upper limit values and allowable values of $CO_2$ emission amounts corresponding to elapsed times after the beginning of the use of the projection type display device according to this embodiment along with the $CO_2$ emission factor and power consumption table described in the first embodiment. An upper limit value is a determination reference value that denotes whether or not to forcibly suppress each function. An allowable value is a determination reference value that denotes whether or not to cancel each suppressed function.

Alternatively, storage section 16 may have stored function suppression priority information that denotes which functions should be preferentially set to an operation state with lower power consumption when the functions are suppressed. The function suppression priority information is preset by the user. For example, the function suppression priority information is set up as follows. The user operates the projection type display device so that the setup menu shown in FIG. 3 appears on the screen. Thereafter, the user operates cursor keys provided on a control panel (not shown) of housing upper section 20 or cursor keys provided on a remote controller (not shown) so as to set up the suppression priority of the functions on function suppression priority setup window 55 shown in FIG. 3.

FIG. 3 shows that when functions are forcibly suppressed, "brightness" is suppressed with the highest priority, then "sound output" is suppressed with the next priority, and last "LAN function" is suppressed with the lowest priority. In addition, since "no suppression" appears at a lower field of a function name on function suppression priority setup window 55, it is clear that any function has not been suppressed.

Operation state control section 15 refers to an elapsed time measured by elapsed time measurement section 17 for every constant period, reads the upper limit value of $CO_2$ emission amounts corresponding to the elapsed time, and compares the cumulative value of $CO_2$ emission amounts computed by the emission amount computation process described in the first embodiment with the upper limit value. If the cumulative value is greater than the upper limit value, operation state control section 15 forcibly changes the operation state of each function to another operation state with lower power consumption based on the function suppression priority information so as to suppress the functions. After operation state control section 15 suppresses the functions, if the cumulative value of $CO_2$ emission amounts becomes lower than the allowable value, operation state control section 15 cancels the suppression of the functions.

Although this embodiment is provided with elapsed time measurement section 17, a calendar function and a clock function provided in an ordinary projection type display device may be used. In this case, operation state control section 15 identifies the date and time with the calendar function and the clock function when the user starts using the device and records the identified date and time to nonvolatile memory (not shown). Thereafter, operation state control section 15 identifies the date and time with the calendar function and the clock function for every constant period, computes the time between the identified date and time and those recorded in nonvolatile memory (not shown), and sets the computed time as the elapsed time.

Figure 12:
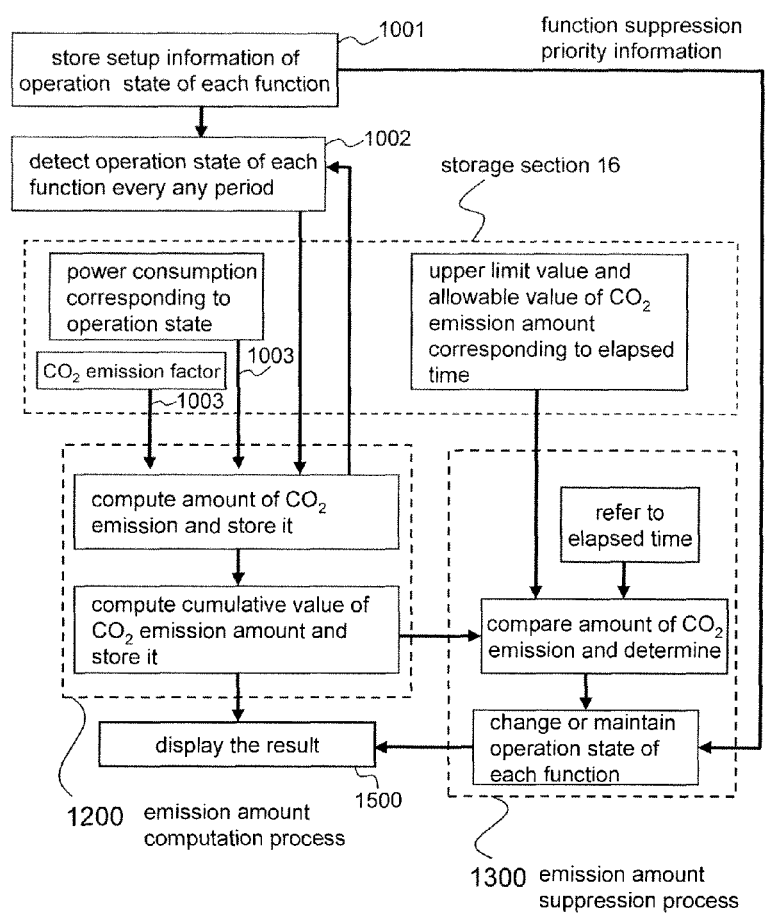
FIG. 12 is a schematic diagram describing a process and operation of the projection type display device according to the second embodiment.

FIG. 12 is a schematic diagram describing the operation of an operation state control section according to this embodiment. FIG. 12 shows information stored in storage section 16 with an area surrounded by dashed lines.

As shown in FIG. 12, operation state control section 15 refers to the elapsed time for every constant period from storage section 16 after starting using the projection type display device, reads the upper limit value and allowable value of $CO_2$ emission amounts corresponding to the elapsed time therefrom, and performs an emission amount suppression process at step 1300. At that point, operation state control section 15 compares the cumulative value of $CO_2$ emission amounts computed at step 1205 shown in FIG. 10 with the upper limit value or allowable value and performs a control that changes or maintains the operation states based on the determined result. If the function suppression priority information is pre-registered in storage section 16, operation state control section 15 changes the operation states based on the function suppression priority information.

Figure 13:
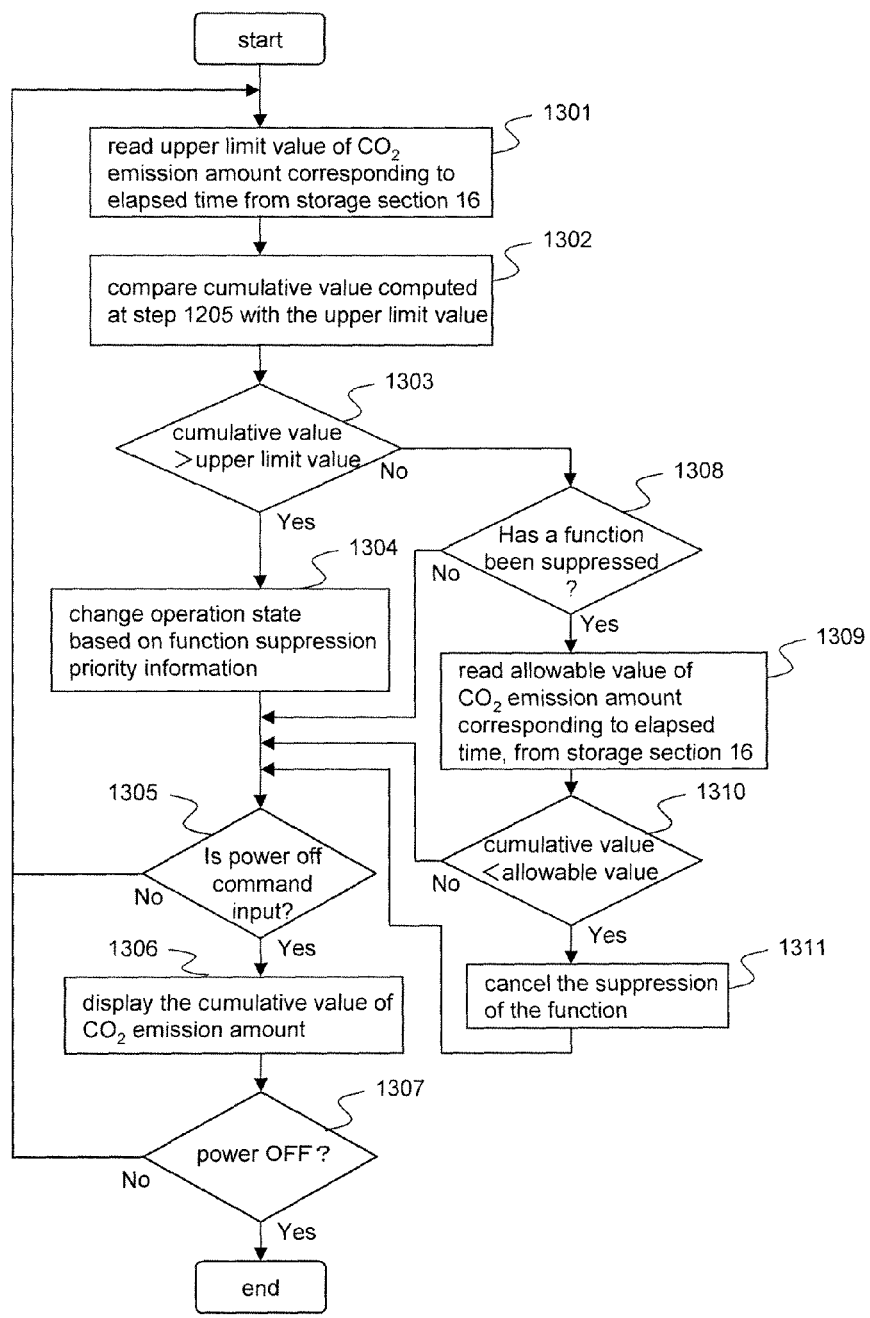
FIG. 13 is a flow chart showing a procedure of the emission amount suppression process.

Next, a procedure of the emission amount suppression process at step 1300 shown in FIG. 12 will be described in detail. FIG. 13 is a flow chart showing the procedure of the emission amount suppression process.

Operation state control section 15 reads the upper limit value of $CO_2$ emission amounts corresponding to the elapsed time from storage section 16 (step 1301) and compares the cumulative value computed at step 1205 shown in FIG. 10 with the upper limit value (step 1302). If the cumulative value is greater than the upper limit value (step 1303), operation state control section 15 changes the operation state of each function based on the function suppression priority information (step 1304).

When the user inputs the power off command to the device (step 1305), operation state control section 15 causes the cumulative value of $CO_2$ emission amounts to appear on the screen (step 1306). Unless the user inputs the power off command to the device, operation state control section 15 returns to step 1301 of the process at an elapsed time of one minute after step 1301. When the user inputs the power off command to the device again (step 1307), operation state control section 15 turns off the power; when the user input a power off cancellation command to the device, operation state control section 15 returns to step 1301.

If the cumulative value is equal to or lower than the upper limit value at step 1303, operation state control section 15 determines whether or not a function has been suppressed (step 1308). Unless a function has been suppressed, operation state control section 15 advances to step 1305 of the process. If a function has been suppressed, operation state control section 15 reads the allowable value of the $CO_2$ emission amounts corresponding to the elapsed time from storage section 16 (step 1309). Thereafter, operation state control section 15 compares the cumulative value with the allowable value (step 1310), and if the cumulative value is lower than the allowable value, operation state control section 15 cancels the suppression of the function (step 1311) and then advances to step 1305 of the process.

In the flow chart shown in FIG. 13, when a function has been suppressed, the cumulative value is compared with the allowable value at step 1310 and if the cumulative value is lower than the allowable value, a control that cancels the suppression of the function is performed at step 1311; however, the control that cancels the suppression of the function might be omitted.

Next, a specific example of the method for the $CO_2$ emission amount suppression process according to this embodiment will be described.

Figure 14:
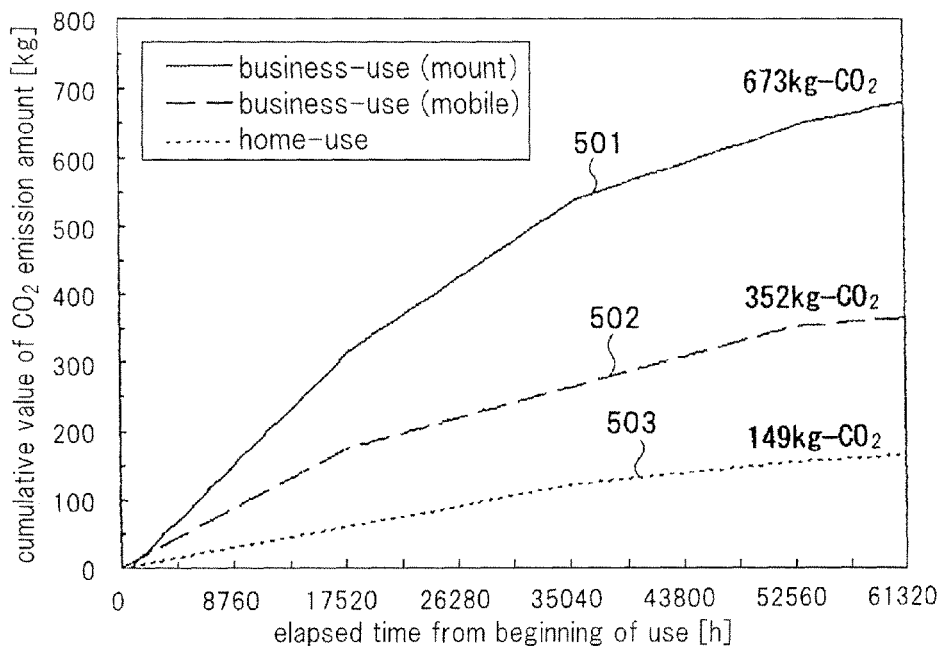
FIG. 14 is a graph showing the relationship between elapsed times and upper limit values of $CO_2$ emission amounts corresponding to applications of a plurality types of projection type display devices.

FIG. 14 is a graph showing the relationship between elapsed times and upper limit values of $CO_2$ emission amounts corresponding to applications of a plurality of projection type display devices. The horizontal axis of the graph represents elapsed times after the initial use of the projection type display device until the planned service life thereof, whereas the vertical axis represents the cumulative values of $CO_2$ emission amounts corresponding to the elapsed times. Hereinafter, a curve that connects upper limit values of $CO_2$ emission amounts is referred to as the upper limit curve.

In this example, three kinds of projection type display devices that have different applications will be considered. The three kinds of projection type display devices are a business-use immobile and projection type display device, a business-use mobile and projection type display device, and a home-use projection type display device. In FIG. 14, the upper limit curve of $CO_2$ emission amounts of the business-use immobile and projection type display device is denoted by solid line 501. On the other hand, the upper limit curve of $CO_2$ emission amounts of the business-use mobile type and projection type display device is denoted by dashed line 502, and the upper limit curve of $CO_2$ emission amounts of the home-use projection type display device is denoted by dashed line 503.

Assuming that the planned service life of each device after the beginning of use is 61320 hours as shown in FIG. 14, the upper limit of the total amount of $CO_2$ emission of the business-use immobile and projection type display device is 673 kg, that of the business-use mobile and projection type display device is 352 kg, and that of the home-use projection type display device is 149 kg.

The upper limit value corresponding to an elapsed time of each device is decided based on the operating time per day and the frequency of use per week after the user purchases the device until the planned service life expires. In addition, the upper limit value is decided such that the upper limit of emission amounts is suppressed from rising as the time elapses without causing any inconvenience to the user using the device.

Next, assuming that the projection type display device according to this embodiment is of business-use immobile type, with an example of the upper limit value and allowable value of $CO_2$ emission amounts, another control executed by operation state control section 15 will be described. Hereinafter, a curve that represents changes of the allowable value as the time elapses is referred to as the suppression cancelation curve.

Figure 15:
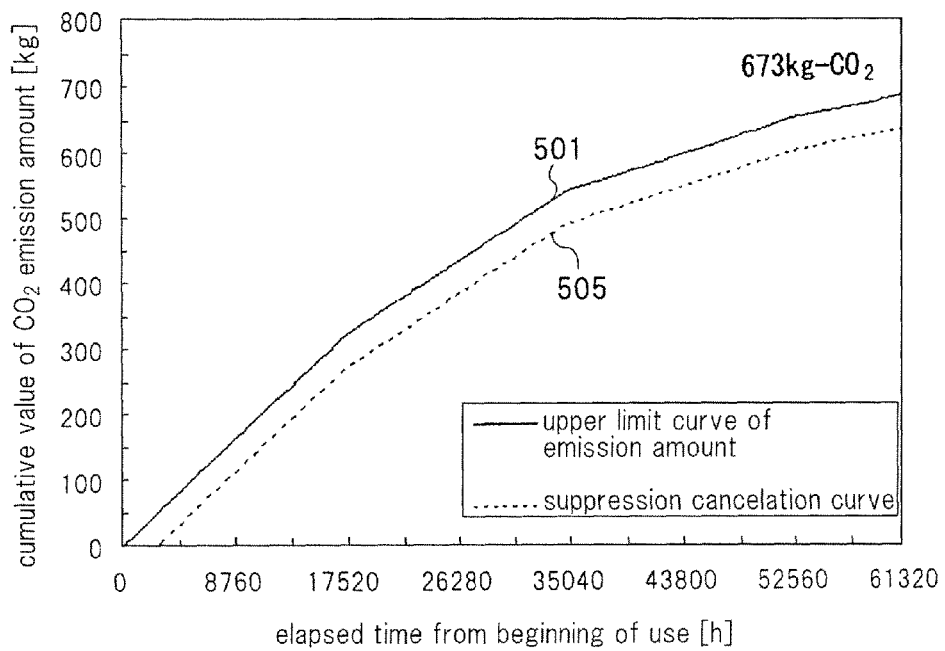
FIG. 15 is a graph showing an example of an upper limit curve and a suppression cancelation curve of $CO_2$ emission amounts of a mount type and projection type display device.

FIG. 15 is a graph showing an example of the upper limit curve and the suppression cancelation curve of $CO_2$ emission amounts of the immobile and projection type display device. In FIG. 15, the upper limit curve is denoted by solid line 501, whereas the suppression cancellation curve is denoted by dashed line 505. The suppression cancellation curve is lower than the upper limit curve at each elapsed time by 50 kg.

In the graph shown in FIG. 15, when the cumulative value of $CO_2$ emission amounts is in excess of the upper limit curve, operation state control section 15 performs the function suppression control corresponding to the procedure described in FIG. 13. At this point, if there is no function that operation state control section 15 suppresses, it forcibly sets the continuously operating period of the device to a predetermined period. According to this embodiment, it is assumed that the continuously operating time is 10 minutes. When the cumulative value of $CO_2$ emission amounts becomes below a value of the suppression cancellation curve, operation state control section 15 cancels the restriction of the function and the continuously operating time.

Next, specific operations and effects of four working examples of the business-use immobile and projection type display device described with reference to FIG. 15 will be described. In the following working examples, the cumulative value computed at step 1205 shown in FIG. 10 is referred to as the actual value.

Working Example 1

This working example is referred to as actual $CO_2$ emission example (1). In this working example, a control method in the case where the operating time of the device is long or the frequency of use of the device is high will be described.

Figure 16:
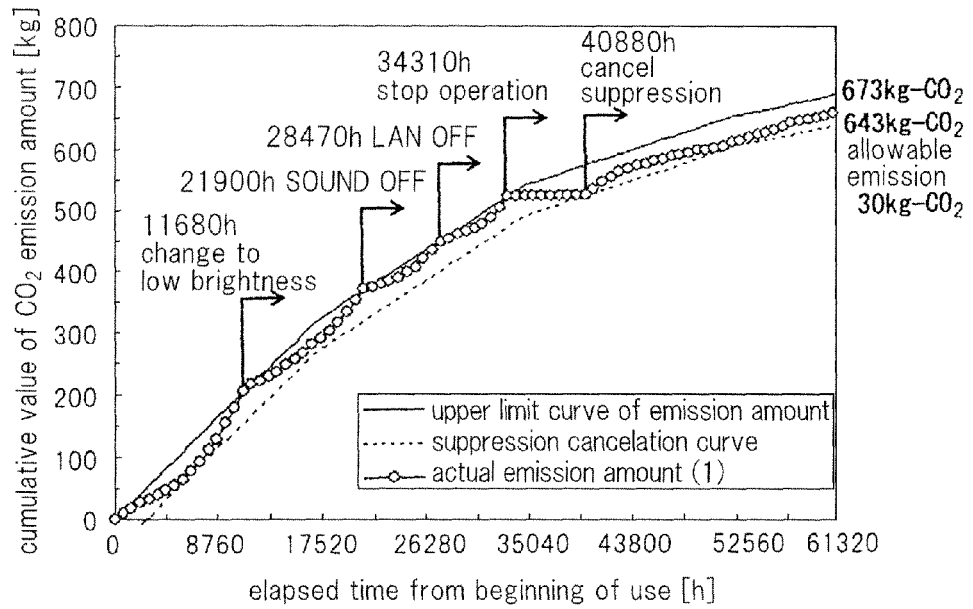
FIG. 16 is a graph showing actual $CO_2$ emission amounts according to working example 1.

FIG. 16 is a graph showing actual $CO_2$ emission amounts according to this working example. In FIG. 16, actual $CO_2$ emission amounts in the case where the operating time of the device is long or where the frequency of use of the device is high are plotted every month with circles. FIG. 16 shows actual $CO_2$ emission example (1) in the case where the frequency of use of the device is high. A high "frequency of use" means that the operating time in the operating period is long. In this working example, the total operating time of the device was 5644 h.

In this working example, the device was used with the default values of the operation states of the individual functions. As described above, with the default values, the brightness is set to "high brightness," the LAN function is set to "ON," and the sound output function is set to "ON." In this working example, it is assumed that the user did not change the operation states of the individual functions. In this working example, the operations and effects of the device will be described corresponding to elapsed times after the beginning of use.

(Operation of Device after the Beginning of the Use (0 h) Before an Elapsed Time of 11680 h)

Figure 17:
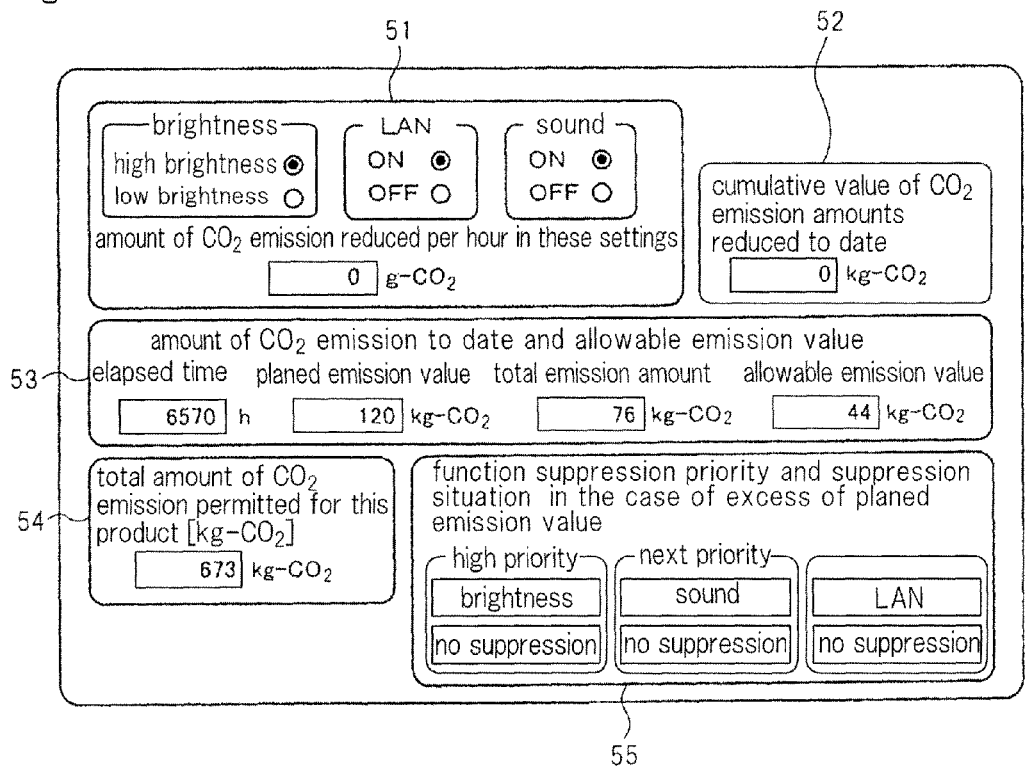
FIG. 17 is an example of a $CO_2$ emission amount menu at an elapsed time of 6570 h in actual $CO_2$ emission amounts according to working example 1.

In this period, since the operating time was short and the frequency of use was low, the user was able to use the device with the default values of the operation states of the individual functions without any restrictions thereof. FIG. 17 is a schematic diagram showing an example of the setup menu at an elapsed time of 6570 h in actual $CO_2$ emission amounts according to this working example. In this working example, the user caused the setup menu screen to appear such that he or she checked amounts of $CO_2$ emission. Hereinafter, the setup menu which the user uses to check amounts of $CO_2$ emission rather than changes settings is referred to as the $CO_2$ emission amount menu.

Progress output window 53 that appears at the middle pane of the screen indicates the planned emission value that is allowed at the elapsed time as "120 kg–$CO_2$", the cumulative emission amount that represents the actual emission amounts as "76 kg–$CO_2$," and the allowable emission value at which a function is forcibly suppressed as "44 kg–$CO_2$." When the user sees the $CO_2$ emission amount menu shown in FIG. 17 and expects that the operating time and frequency of use will not change from now on, if he or she changes the operation states of the functions, these functions can be prevented from being forcibly suppressed. If the user does not change the settings, he or she recognizes that the operating time and frequency of use need to be shortened and lowered, respectively. The total $CO_2$ emission amount appears on allowable value output window 54 at the lower left pane of the screen.

Function suppression priority setup window 55 that appears at the lower right pane of the screen indicates "function suppression priority and suppression situation in the case where the amount of emission has exceeded the planned emission value." Function suppression priority setup window 55 also indicates settings that denote priority in which individual functions should be suppressed if the actual $CO_2$ emission amount is in excess of the upper limit value of CO2 emission amounts. The content of the settings has been stored as function suppression priority information in storage section 16.

The settings that appear on function suppression priority setup window 55 shown in FIG. 17 denote that first the brightness is suppressed from "high brightness" to "low brightness," then the sound output is suppressed from "ON" to "OFF," and lastly the LAN function is suppressed from "ON" to "OFF."

(Operation of Device after an Elapsed Time of 11680 h Before an Elapsed Time of 21900 h)

Since the actual emission amount is in excess of the upper limit value of $CO_2$ emission amounts at an elapsed time of 11680 h, operation state control section 15 changes the lamp output from "high brightness" to "low brightness" based on the function suppression priority information. This control causes the function of "brightness" that has a higher suppression priority to be restricted and thereby "high brightness" to be changed to "low brightness." The user can check this situation in "function suppression priority and suppression situation in the case where the amount of emission has exceeded the planned emission value" on function suppression priority setup window 55 on the screen shown in FIG. 17 that denotes that "low brightness" appears at the lower field of "brightness." At this point, the sound output and LAN function have not been restricted.

Figure 18:
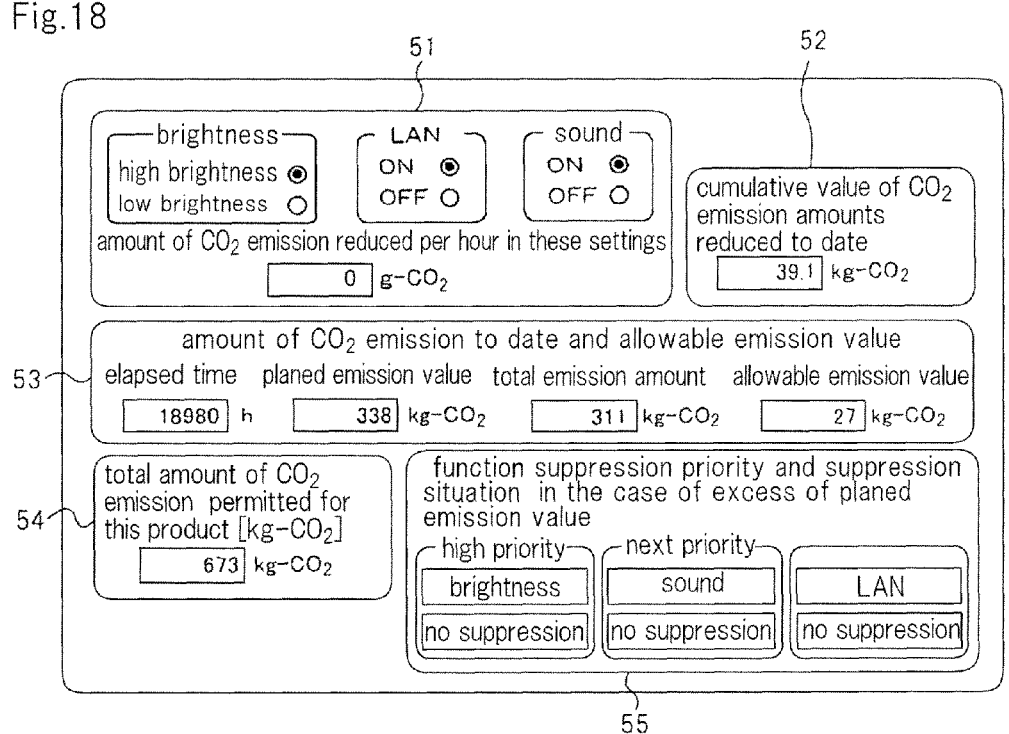
FIG. 18 is an example of a $CO_2$ emission amount menu at an elapsed time of 18980 h in actual $CO_2$ emission amounts according to working example 1.

FIG. 18 shows an example of the $CO_2$ emission amount menu at an elapsed time of 18980 h. Progress output window 53 that appears at the middle pane shown in FIG. 18 indicates the planned emission value permitted corresponding to the elapsed time as "338 kg–$CO_2$," the cumulative value of emission amounts that represents the actual emission amounts as "311 kg–$CO_2$," and the allowable value of emission amounts at which a function is forcibly suppressed as "27 kg–$CO_2$." Since the effects of these amounts that appear on the screen for the user are the same as those shown in FIG. 17, the detailed description will be omitted.

(Operation of Device after an Elapsed Time of 21900 h Before an Elapsed Time of 28470 h)

In the state in which "brightness" had been restricted to "low brightness," since the actual emission amount was in excess of the upper limit value of $CO_2$ emission amounts at the elapsed time of 21900 h, operation state control section 15 changes the sound output from "ON" to "OFF" based on the function suppression priority information. This control restricted the function "sound output" that has a function suppression priority that is just lower than that of "brightness" and thereby "ON" was changed to "OFF." This changing operation will be reflected in the device at next start time after the device is stopped.

(Operation of Device after an Elapsed Time of 28470 h Before an Elapsed Time of 34310 h)

In the state in which the functions had been restricted such that "brightness" had been set to "low brightness" and "sound output" had been set to "OFF," the actual emission amount was in excess of the upper limit value of $CO_2$ emission amounts at an elapsed time of 28470 h. Thus, operation state control section 15 changes the LAN function from "ON" to "OFF" based on the function suppression priority information. This control restricted the LAN function that has a function suppression priority that is just lower than that of the sound output and thereby "ON" was changed to "OFF."

(Operation of Device after an Elapsed Time of 34310 h Before an Elapsed Time of 40880 h)

In the state in which the functions had been restricted such that "bright" had been set to "low brightness," "sound output"

had been set to "OFF," and "LAN function" had been set to "OFF," the actual emission amount was in excess of the upper limit value of $CO_2$ emission amounts at an elapsed time of 34310 h. However, since there was no function to be suppressed, operation state control section 15 changed the device to a mode in which the device was prohibited from being used beyond a predetermined period (prohibition-of-use mode). In the prohibition-of-use mode, even if the user operates the device, operation state control section 15 forcibly puts the device into the stop process approximately 10 minutes after the beginning of the operation such that it is prohibited from being continuously used.

When the device has changed to the prohibition-of-use mode, operation state control section 15 obtains the date and time at which the prohibition-of-use mode is cancelled and displays information of the obtained date and time before stopping the operation of the device.

(Operation of Device after an Elapsed Time of 40880 h Before the Planned Service Life)

When suppression of the functions and the prohibition-of-use mode was cancelled depending on the time elapsed, the functions of the device were not restricted and thereby it was able to be continuously used.

Working Example 2

This working example is referred to as actual $CO_2$ emission example (2). In this working example, a control method in the case where the operating time of the device was long or where the frequency of use of the device was high on a particular occasion will be described.

Figure 19:
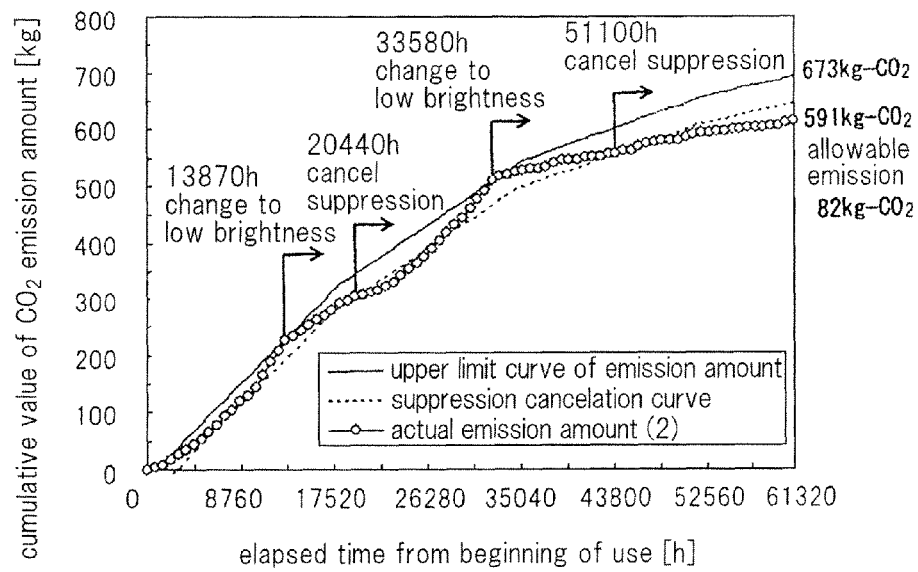
FIG. 19 is a graph showing actual $CO_2$ emission amounts according to working example 2.

FIG. 19 is a graph showing actual $CO_2$ emission amounts according to this working example. FIG. 19 shows actual $CO_2$ emission example (2) in the case in which the frequency of use of the device was high on a particular occasion. In this working example, the total operating time of the device was 4684 h.

In this working example, the device was used with the default values of the operation states of the individual functions. As described above, with the default values, the brightness is set to "high brightness," the LAN function is set to "ON," and the sound output function is set to "ON." In this working example, it is assumed that the user did not change the operation states of the individual functions while the device was operated. The operation of the device will be described corresponding to elapsed times after the beginning of the use.

(Operation of Device after the Beginning of Use (0 h) Before an Elapsed Time of 13870 h)

In this period, the operating time of the device was short and the frequency of use of the device was low and thus the user was able to use the device without restrictions on the operation states of the functions.

(Operation of Device after an Elapsed Time of 13870 h Before an Elapsed Time of 20440 h)

Since the actual emission amount was in excess of the upper limit value of $CO_2$ emission amounts at an elapsed time of 13870 h, operation state control section 15 executed a control based on the function suppression priority information so that the function "brightness" having a higher function suppression priority was restricted and thereby "brightness" was changed from "high brightness" to "low brightness."

(Operation of Device after an Elapsed Time of 20440 h Before an Elapsed Time of 33580 h)

Since the function suppression effect in which "brightness" had been set to "low brightness" and the operating time of the device was short and the frequency of use of the device was low, the actual emission amount was below the suppression release curve at the elapsed time of 20440 h. Thus, operation state control section 15 cancelled the suppression of the function. After the suppression of the function was cancelled, the user was able to use the device in the operation state "high brightness" of the function "brightness."

(Operation of Device after an Elapsed Time of 33580 h Before an Elapsed Time of 51100 h)

Since the actual emission amount was in excess of the upper limit value of $CO_2$ emission amounts at an elapsed time of 33580 h again, operation state control section 15 executed a control based on function suppression priority information. As a result, the function "brightness" having a higher function suppression priority was restricted and thereby "brightness" was changed from "high brightness" to "low brightness."

(Operation of Device after an Elapsed Time of 51100 h Before the Planned Service Life)

Since the function suppression effect in which "brightness" had been set to "low brightness," the operating time of the device was short, and the frequency of use of the device was low, the actual emission amount reached a level lower than the suppression release curve at an elapsed time of 51100 h. Thus, operation state control section 15 cancelled suppression of the function. After suppression of the function was cancelled, the user was able to use the device in the operation state "high brightness" of the function "brightness." Thereafter, the user was able to use the device without any restriction of the function.

Working Example 3

This working example is referred to as actual $CO_2$ emission example (3). In this working example, a control method in the case in which the operating time of the device was short and the frequency of use of the device was low will be described.

Figure 20:
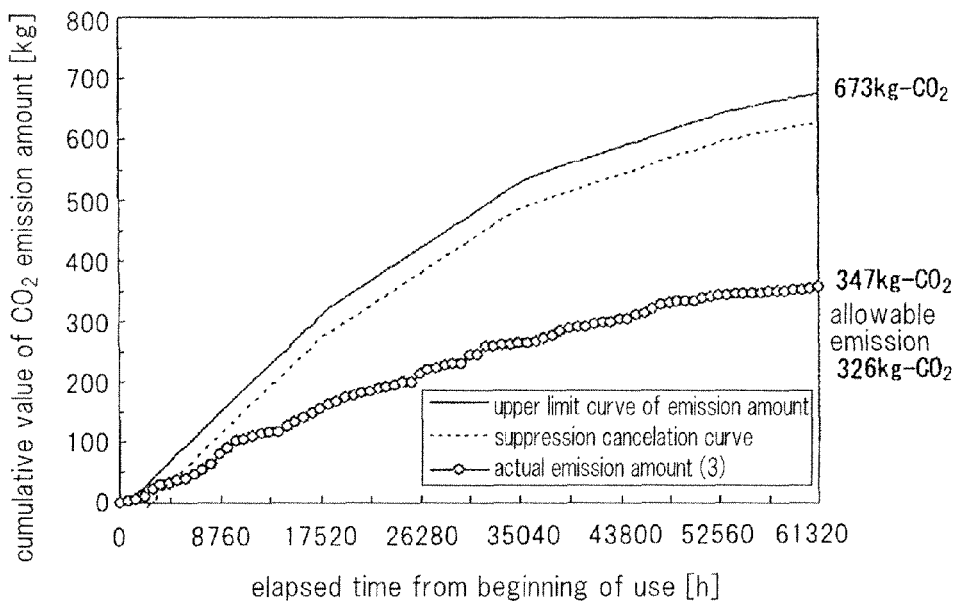
FIG. 20 is a graph showing actual $CO_2$ emission amounts according to working example 3.

FIG. 20 is a graph showing actual $CO_2$ emission amounts according to this working example. FIG. 20 shows the actual $CO_2$ emission example (3) in the case in which the operating time of the device was short and the frequency of use of the device was low. In this working example, the total operating time of the device was 2757 h and the average operating time was 32.8 h/month. Here, the operation of the device according to this working example will be described corresponding to elapsed times after the beginning of use.

(Operation of Device after the Beginning of Use (0 h) Before an Elapsed Time of 13140 h)

In this period, the device was used with the default values of the operation states of the individual functions. As was described above, with the default values, the brightness is set to "high brightness," the LAN function is set to "ON," and the sound output function is set to "ON." In this working example, the user did not change the operation states of the individual functions while the device was being used.

(Operation of Device after an Elapsed Time of 13140 h Before an Elapsed Time of 21170 h)

After the user had changed "brightness" from "high brightness" to "low brightness" at an elapsed time of 13140 h, the device was used in the settings in which "brightness" had been changed to "low brightness."

(Operation of Device after an Elapsed Time of 21170 h Before an Elapsed Time of 49640 h)

After the user had changed "brightness" from "low brightness" to "high brightness" at an elapsed time of 21170 h, the device was used in the setting in which "brightness" had been changed to "high brightness."

(Operation of Device after an Elapsed Time of 49640 h Before the Planned Service Life)

After the user had changed "brightness" from "high brightness" to "low brightness" at an elapsed time of 49640 h, the device was used in the setting in which "brightness" had been changed to "low brightness."

In this working example, the device was not heavily used after the beginning of use until the end of the planned service life and thereby the operation states of the individual functions were not forcibly changed. In this working example, the total $CO_2$ emission amount was "347 kg–$CO_2$" and the difference between this value and the upper limit value of total $CO_2$ emission amounts, "673 kg–$CO_2$," was "326 kg–$CO_2$" as an allowable emission value.

Working Example 4

This working example is referred to as actual $CO_2$ emission example (4). In this working example, although the operating time of the device was long and the frequency of use of the device was high, the difference between this working example and working example 1 will be described.

Figure 21:
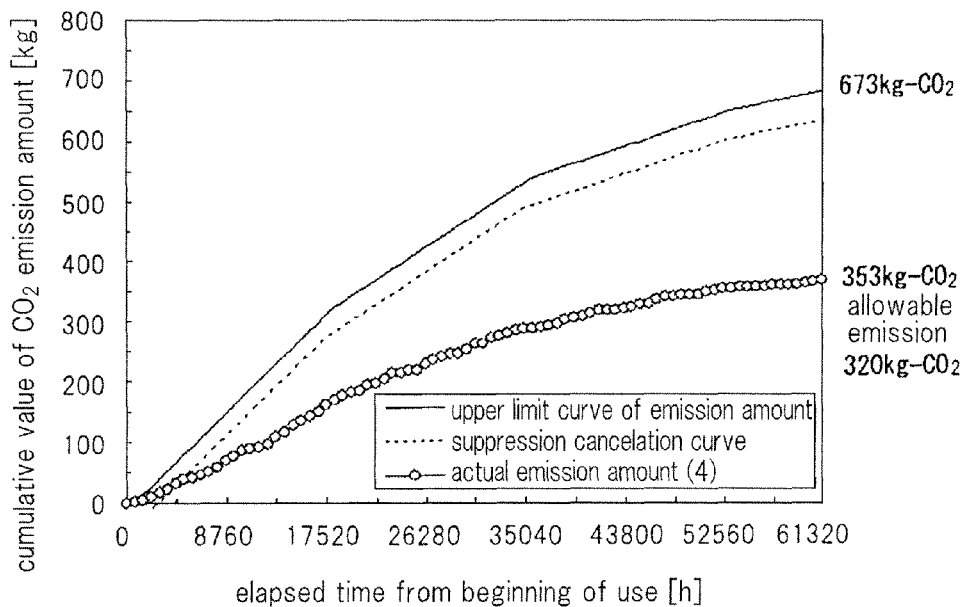
FIG. 21 is a graph showing actual $CO_2$ emission amounts according to working example 4.

FIG. 21 is a graph showing actual $CO_2$ emission amounts according to this working example. FIG. 21 shows actual $CO_2$ emission example (4) in the case where although the operating time of the device was long and the frequency of use of the device was high, the user used the device while the functions were suppressed. In this working example, the total operating time of the device was 34987 h and the average operating time was 41.6 h/month.

In this working example, since the user had set "brightness" to the operation state "low brightness," the actual $CO_2$ emission value after the beginning of the use of the device until the end of the planned service life was "353 kg–$CO_2$" that was nearly the same as that of actual emission example (3) according to working example 3.

Figure 22:
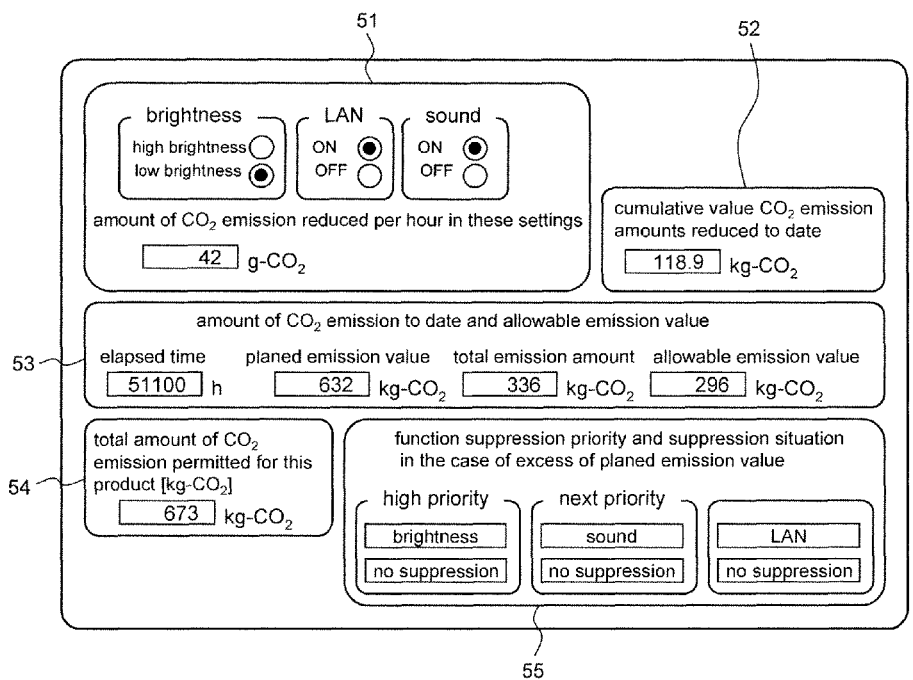
FIG. 22 is an example of a $CO_2$ emission amount menu at an elapsed time of 51100 h in actual $CO_2$ emission amounts according to working example 4.

FIG. 22 is an example of the $CO_2$ emission amount menu at an elapsed time of 51100 h in actual CO, emission amounts according to this working example. Progress output window 53 that appears at the middle pane shown in FIG. 22 indicates the planned emission value permitted corresponding to the elapsed time as "632 kg–$CO_2$," the cumulative emission value that is actual emission amount as "336 kg–$CO_2$," and the allowable emission value at which the functions are forcibly suppressed as "296 kg–$CO_2$."

As indicated on cumulative value output window 52 at an upper right pane of the screen shown in FIG. 22, since the $CO_2$ reduction amount is "118.9 kg–$CO_2$," it is clear that the reduction amount is very large.

According to the foregoing first and second embodiments, since amounts of a greenhouse gas emission or increased/decreased amounts of the greenhouse gas emission appear corresponding to conditions in which the device is used, the user can be motivated to reduce an amount of the greenhouse gas that will be emitted. In addition, since the functional section of the electronic device according to the embodiments is provided with a plurality of selectable operation states that differ in power consumption, when the user who is motivated to reduce an amount of the greenhouse gas that will be emitted selects an operation state having low power consumption, the emission amount of the greenhouse gas can be reduced.

An example of the effects of the present invention is that the user is instructed that the amount of the greenhouse gas that will be emitted depends on the operation states of the functions of the device and he or she is caused to select an operation state in which the amount of emitted greenhouse gas will be reduced.

Alternatively, before the device is sold, the upper limit value of the amounts of permissible greenhouse gas that will be emitted in the operating period for the device is pre-set, if the emission amount is in excess of the upper limit value, the operation states of the functions may be restricted or operation of the device may be forcibly prohibited until the emission amount reaches a level that is below the upper limit value. In this case, the user can use the device until the service life expires without causing any inconvenience to the user using the device so that the device emits the greenhouse gas as planned and the total emission amount of the greenhouse gas is suppressed to the planned upper limit value or below when the planned service life of the device expires.

According to the foregoing embodiments, power consumption values corresponding to operation states of functions are pre-registered in the storage section and a $CO_2$ emission amount is obtained by multiplying a power consumption value corresponding to a selected operation state by the $CO_2$ emission factor. Alternatively, another approach is one in which pre-computed amounts of $CO_2$ emission corresponding to operation states of functions are stored in the device instead of power consumption values corresponding to operation states of functions and thereby a $CO_2$ emission amount corresponding to a selected operation state is obtained without using the $CO_2$ emission factor. Likewise, one approach is one in which reference value of amount of $CO_2$ emission may be pre-registered in the device instead of power consumption reference.

However, in the method that does not use a $CO_2$ emission factor to compute amounts of $CO_2$ emission, it may be difficult to handle changes of the $CO_2$ emission factor after purchase of the product and to use $CO_2$ emission factors that differ in countries or regions. To solve such a problem, according to these embodiments, a $CO_2$ emission factor is pre-stored in the device and an amount of $CO_2$ emission is obtained by multiplying the computed power consumption value by the $CO_2$ emission factor. Specifically, when $CO_2$ emission factors that differ in countries or regions are pre-registered in the storage section of the electronic device and the user who purchased the electronic device inputs a command that designates his or her living country or region in the device, the operation state control section can use the $CO_2$ emission factor that corresponds to the country or region.

In the foregoing embodiments, when the user inputs a command that causes the operation state of a function to be changed in the device, the operation state control section quickly changes the operation state corresponding to the command. Alternatively, information of amounts of $CO_2$ emission or increased/decreased amounts of $CO_2$ emission corresponding to the operation states of individual functions may be pre-registered in the storage section such that before the operation state control section changes a device operation state, amounts of $CO_2$ emission or increased/decreased amounts of $CO_2$ emission appear before and after the operation state is changed. When the user inputs the operation state change command into the device, since he or she can quickly check the effect of changing the operation state, the effect in which the user is motivated to change the operation state becomes large.

Moreover, in the foregoing embodiments, the three functions of the light source output change function, sound output function, and communication function are control targets and power consumption of the device is changed by changing the operation states; however, the number of control targets is not limited to the foregoing three. Since the light source output affects power consumption the most in the foregoing three functions, even if only the light source output is a control target, the amount of emitted greenhouse gas can be remarkably reduced. Thus, even if only the light source output is changed, the effect in which the amount of emitted greenhouse gas is remarkably reduced can be expected for a device that is not provided with a sound output function and communication function and a device from which these functions have been removed to reduce the cost of the device.

In addition, since parameters such as the power consumption reference value, the emission factor of a greenhouse gas, power consumption values corresponding to a plurality of operation states, upper limit values and allowable values of amounts of the greenhouse gas that are emitted corresponding to elapsed times, and so forth are pre-set as default values before shipment, it is not desirable to change these parameter values. However, the emission factors of greenhouse gases may be changed as countries and regions develop. Thus, it is preferable that the parameters be changed after shipment. To do that, the following control is executed.

A password used for authentication is pre-registered in storage section 16. When a parameter change signal containing a parameter change value and the password is input to operation state control section 15, it determines whether or not the input password matches the password stored in storage section 16. When they match, operation state control section 15 updates the parameter value stored in storage section 16 to the change value contained in the parameter change signal. In contrast, when the two passwords do not match, operation state control section 15 continuously uses the parameter value stored in storage section 16, and does not change it.

In this case, the parameter change signal can be directly input to the main body of the device by a technician of the manufacturer when the projection type display device is maintained or by a server of the manufacturer in communication with the device while the projection type display device is connected to the server through LAN circuit section 12 and a network. When a parameter change value and a password are directly input to the main body of the device or through a LAN circuit, the parameter value can be updated.

According to the foregoing embodiments, the greenhouse gas was described as $CO_2$. Alternatively, the greenhouse gas may be methane ($CH_4$) or dinitrogen monoxide ($N_2O$).

In addition, according to the foregoing embodiments, the electronic device was described as a projection type display device. Alternatively, the electronic device may be an image display device or another type of device. Like the foregoing projection type display device, the embodiments of the present invention can be applied to an image display device as long as it is provided with the light source output change function, LAN function, and sound output function and thereby the foregoing effects can be obtained.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

DESCRIPTION OF REFERENCE NUMERALS

10 Main substrate
34 Power supply unit
35 Lamp unit
11 Sound output circuit section
12 LAN circuit section
13 Power feeding line control section of sound output circuit section
14 Power feeding line control section of LAN circuit section
15 Operation state control section
16 Storage section
341 Power supply feeding section
342 Ballast power supply

The invention claimed is:

1. An electronic device comprising:
an input acceptance section that accepts an input of a command that causes any one of a plurality of operation states to be selected;
a function section that has a plurality of operation states that differ in power consumption and that operates in an operation state represented by the command that is input to the input acceptance section of the plurality of operation states;
a storage section that pre-stores power consumption values corresponding to the plurality of operation states and a conversion factor, based on which, power consumption is converted into an amount of emitted greenhouse gas; and
a control section that reads from the storage section a power consumption value corresponding to an operation state represented by the command that is input to the input acceptance section, multiplies the power consumption value that has been read by the conversion factor, obtains the multiplied result as the amount of the emitted greenhouse gas per unit time, and causes the obtained result to appear on a display section.

2. The electronic device according to claim 1,
wherein the control section detects which of the plurality of operation states has been selected at predetermined periods after the electronic device starts until it stops, obtains the amount of the greenhouse gas per the predetermined period corresponding to the detected operation state, stores a sum of the amounts of the emitted greenhouse gas after the electronic device starts until the present time as a cumulative value in the storage section, and then causes the cumulative value to appear on the display section corresponding to a command that is input to cause the electronic device to stop or corresponding to a command that is input to cause the cumulative value to appear.

3. The electronic device according to claim 2,
wherein upper limit values, as determination reference based on which the present operation state of the function section should be changed to another operation state with lower power consumption than the present operation state, are pre-stored in the storage section corresponding to elapsed times after the electronic device initially starts until the present time,
wherein the control section compares the upper limit value corresponding to the elapsed time with the cumulative value stored in the storage section for every predetermined period and changes the present operation state to another operation state with lower power consumption than the present operation state if the compared result denotes that the cumulative value is greater than the upper limit value.

4. The electronic device according to claim 3,
wherein information of a time limit at which a continuous operation of the electronic device is limited is pre-stored in the storage section, and
wherein when the control section causes the function section to change the present operation state to another operation state with lower power consumption than the present operation state, if there is no operation state with lower power consumption than the present operation state, the control section sets the continuous operation period of the electronic device to the time limit.

5. The electronic device according to claim 3,
wherein allowable values, as determination reference based on which the control section causes the function section to return the operation state to a former operation state, are pre-stored in the storage section corresponding to the elapsed times, and
wherein if the compared result denotes that the cumulative value is equal to or lower than the upper limit value, the control section determines whether or not the present operation state has been set to an operation state that is different from the selected operation state; if the present operation state is different from the selected operation state, the control section compares the cumulative value with the allowable value; if the cumulative value is lower than the allowable value, the control section causes the function section to return the operation state to the selected operation state, and if the present operation state is the same as the selected operation state, the control section maintains the present operation state.

6. The electronic device according to claim 3,
wherein the electronic device has a plurality of the function sections,
wherein function suppression priority information that denotes which one of the plurality of the function sections is a control target is pre-stored in the storage section, and
wherein when the control section changes the present operation state to another operation state, the control section decides the function section as a control target corresponding to a priority order denoted by the function suppression priority information.

7. The electronic device according to claim 1,
wherein the function section comprises any section from among a light source output change function section, a communication function section, and a sound output function section.

8. The electronic device according to claim 1,
wherein the conversion factor that differs in each country or each region is pre-registered in the storage section, and
wherein the control section uses the conversion factor that is set corresponding to a command that is issued from an outside when the electronic device is used, the conversion factor corresponding to the country or the region.

9. The electronic device according to claim 1, further comprising:
a power feeding control section that is provided between a power supply section to which power is supplied from the outside and the function section and that controls power feeding to the function section,
wherein the control section controls the power feeding control section based on the detected operation state corresponding to the function section.

10. The electronic device according to claim 1,
wherein a password for authentication is pre-registered in the storage section, and
wherein when a parameter change signal containing a change value of a parameter and the password is input, the parameter being at least one of the power consumption values corresponding to the plurality of operation states and the conversion factor, the control section determines whether or not the password that has been input and a password that has been stored in the storage section match, the control section updates a value of the parameter stored in the storage section to the change value contained in the parameter change signal if the two passwords match, and the control section does not change the value of the parameter value stored in the storage section if the two parameters do not match.

11. The electronic device according to claim 1,
wherein the electronic device comprises an image display device or a projection type display device.

12. The electronic device according to claim 1,
wherein the greenhouse gas comprises any gas from among carbon dioxide, methane, and dinitrogen monoxide.

13. A control method for an electronic device having: an input acceptance section that accepts an input of a command that causes any one of a plurality of operation states to be selected; and a function section that has a plurality of operation states that differ in power consumption and that operates in an operation state represented by the command that is input to the input acceptance section of the plurality of operation states, the control method comprising:
storing power consumption values corresponding to the plurality of operation states and a conversion factor, based on which, power consumption is converted into an amount of emitted greenhouse gas, in a storage section;
reading from the storage section a power consumption value corresponding to an operation state represented by the command that is input to the input acceptance section; and
multiplying the power consumption value that has been read by the conversion factor, obtaining the multiplied result as the amount of the emitted greenhouse gas per unit time and causing the obtained result to appear on a display section.

14. The control method for the electronic device according to claim 13, comprising:
detecting which of the plurality of operation states has been selected at predetermined periods after the electronic device starts until it stops and obtaining the amount of the emitted greenhouse gas per the predetermined period corresponding to the detected operation state;
storing a sum of the amounts of the emitted greenhouse gas after the electronic device starts until the present time as a cumulative value in the storage section; and
causing the cumulative value to appear on the display section corresponding to a command that is input to cause the electronic device to stop or corresponding to a command that is input to cause the cumulative value to appear.

15. The control method for the electronic device according to claim 14, comprising:
storing upper limit values, as determination reference based on which the present operation state of the function section should be changed to another operation state with lower power consumption than the present operation state, in the storage section corresponding to elapsed times after the electronic device initially starts until the present time; and
comparing the upper limit value corresponding to the elapsed time with the cumulative value stored in the storage section for every predetermined period and changing the present operation state to another operation state with lower power consumption than the present operation state if the compared result denotes that the cumulative value is greater than the upper limit value.

16. The control method for the electronic device according to claim 15, comprising:

storing information of a time limit at which a continuous operation of the electronic device is limited in the storage section, and when causing the function section to change the present operation state to another operation state with lower power consumption than the present operation state, if there is no operation state with lower power consumption than the present operation state, setting the continuous operation period of the electronic device to the time limit.

17. The control method for the electronic device according to claim 15, comprising:

storing allowable values, as determination reference based on which the control section causes the function section to return the operation state to a former operation state, in the storage section corresponding to the elapsed times; and if the compared result denotes that the cumulative value is equal to or lower than the upper limit value, determining whether or not the present operation state has been set to an operation state that is different from the selected operation state; if the present operation state is different from the selected operation state, comparing the cumulative value with the allowable value; if the cumulative value is lower than the allowable value, causing the function section to return the operation state to the selected operation state, and if the present operation state is the same as the selected operation state, maintaining the present operation state.

18. The control method for the electronic device according to claim 14, wherein the electronic device has a plurality of the function sections, wherein the control method comprises:

storing function suppression priority information that denotes which one of the plurality of the function sections comprises a control target in the storage section; and when the present operation state is changed to another operation state, deciding the function section as a control target corresponding to a priority order denoted by the function suppression priority information.

19. The control method for the electronic device according to claim 13, comprising:

registering the conversion factor that differs in each country or each region to the storage section; and using the conversion factor that is set corresponding to a command that is issued from an outside when the electronic device is used, the conversion factor corresponding to the country or the region.

20. The control method for the electronic device according to claim 13, comprising:

registering a password for authentication to the storage section; and when a parameter change signal containing a change value of a parameter and the password is input, the parameter being at least one of the power consumption values corresponding to the plurality of operation states and the conversion factor, determining whether or not the password that has been input and a password that has been stored in the storage section match, updating a value of the parameter stored in the storage section to the change value contained in the parameter change signal if the two passwords match, and not changing the value of the parameter stored in the storage section if the two parameters do not match.

* * * * *